US 7,492,615 B2

(12) United States Patent
Morota et al.

(10) Patent No.: US 7,492,615 B2
(45) Date of Patent: Feb. 17, 2009

(54) SWITCHING POWER SUPPLY

(75) Inventors: Naohiko Morota, Osaka (JP); Kazuhiro Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 146 days.

(21) Appl. No.: 11/700,924

(22) Filed: Feb. 1, 2007

(65) Prior Publication Data
US 2007/0253228 A1 Nov. 1, 2007

(30) Foreign Application Priority Data
Apr. 27, 2006 (JP) .............................. 2006-122756

(51) Int. Cl.
*H02M 3/335* (2006.01)
*H02M 7/5395* (2006.01)

(52) U.S. Cl. .................... 363/21.16; 363/21.15; 363/97

(58) Field of Classification Search .................. 363/15, 363/16, 20, 21.01, 21.07, 21.08, 21.09, 21.1, 363/21.11, 21.15, 21.16, 21.17, 21.18, 97, 363/131, 21.04, 21.12
See application file for complete search history.

(56) References Cited

U.S. PATENT DOCUMENTS

| 6,529,391 | B2 * | 3/2003 | Yoshinaga et al. | ........ 363/21.15 |
| 7,027,313 | B2 | 4/2006 | Amei | ........................... 363/21 |
| 7,161,815 | B2 * | 1/2007 | Mori | ....................... 363/21.12 |
| 2002/0145888 | A1 * | 10/2002 | Yoshinaga et al. | ........ 363/21.15 |

FOREIGN PATENT DOCUMENTS

JP          7-170731         7/1995

* cited by examiner

*Primary Examiner*—Gary L Laxton
(74) *Attorney, Agent, or Firm*—Steptoe & Johnson LLP

(57) ABSTRACT

A feedback circuit (3) generates an error amplification signal VEAO for stabilizing an output voltage Vo at the reference voltage. The reference voltage is set beforehand in the feedback circuit (3). The peak value of drain current ID passing through a switching element (1) is controlled by the error amplification signal VEAO and the output voltage Vo is stabilized. Meanwhile, when a load (132) increases, a reference voltage variable circuit (13) increases the internal reference voltage of the feedback circuit (3) based on the error amplification signal VEAO, so that fluctuations in output voltage due to load fluctuations are reduced.

17 Claims, 14 Drawing Sheets

SWITCHING POWER SUPPLY

The present application claims priority to Japanese Patent Application No. 2006-122756, filed Apr. 27, 2006, which application is incorporated herein by reference in its entirety.

FIELD OF THE INVENTION

The present invention relates to a switching power supply for stabilizing an output voltage from a light load to a heavy load.

BACKGROUND OF THE INVENTION

In recent years, switching power supplies have been widely used in response to the needs for miniaturization of electronic equipment and higher power conversion efficiency of electronic equipment. In switching power supplies, after commercial AC power is rectified and smoothed to DC power, the power is converted to RF power by a switching operation of a semiconductor device having a high breakdown voltage, the power is transferred by a small transformer for power conversion, and the transferred power is rectified and smoothed to obtain low voltage DC power.

Further, consciousness about the issue of energy conservation has risen worldwide. Against this backdrop, electronic equipment with lower standby consumption has been demanded and thus techniques for reducing standby power consumption during the use of switching power supplies have been developed.

Moreover, in a switching power supply, an input side and an output side are electrically insulated from each other for safety by a power conversion transformer, and thus in order to control an output voltage Vo, the following technique has been widely used: the output voltage Vo on the secondary side is detected by a secondary-side output voltage detection circuit provided on the secondary side, a signal indicating the detection is transferred from the secondary side to the primary side through a photocoupler, and the output voltage Vo is controlled based on the transferred signal.

However, the provision of secondary-side output voltage detection circuits and photocouplers has interfered with miniaturization of switching power supplies. Further, in small switching power supplies, the provision of secondary-side output voltage detection circuits and photocouplers increases the cost. For this reason, a technique called auxiliary winding feedback has been conventionally used instead of secondary-side output voltage detection circuits and photocouplers. To be specific, in this technique, a voltage generated on an auxiliary wining provided on the primary side is the turns ratio times a voltage generated on a secondary winding. The voltage generated on the auxiliary winding is rectified and smoothed to obtain a voltage substantially proportionate to an output voltage Vo, and the output voltage Vo is controlled based on the obtained voltage.

A control method for stabilizing the output voltage of a switching power supply includes PWM control for controlling output voltage by changing a ratio (duty ratio) between the on time and the off time of a switching element, and PFM control for controlling output voltage by changing the off time of a switching element while fixing the on time of the switching element. To be specific, in PWM control, when a load increases and an output voltage Vo decreases, the on time of a pulse for driving a switching element is increased. On the other hand, in PFM control, when a load decreases and an output current Io also decreases, the frequency of a pulse for driving a switching element is reduced.

A mode of controlling the driving of a switching element thus based on a pulse includes: current mode of controlling the driving of the switching element based on both of the detection of an output voltage and the detection of a drain current passing through the switching element, and voltage mode of controlling the driving of the switching element based on the detection of an output voltage.

As an example of a conventional switching power supply, the following will describe a switching power supply of auxiliary winding feedback type for performing PWM control in the current mode. FIG. 10 is a block diagram showing the conventional switching power supply.

In FIG. 10, a switching element 1 is a power MOSFET. The switching element 1 has three terminals of a DRAIN terminal acting as an input terminal, a SOURCE terminal acting as an output terminal, and a GATE terminal acting as a control terminal. The switching element 1, in response to a control signal received on the control terminal, oscillates so as to electrically couple or decouple the input terminal and the output terminal. Further, the switching element 1 switches, according to the oscillating operation (switching operation), a DC voltage supplied to a primary winding 110A of a transformer 110 for power conversion. The switching operation of the switching element 1 generates a pulse voltage on a secondary winding 110B and an auxiliary winding 110C.

A control circuit 100 is formed on the same semiconductor substrate. The control circuit 100 controls the switching operation (oscillating operation) of the switching element 1 by generating a control signal and transmitting the signal to the control terminal of the switching element 1. Further, the control circuit 100 has, as external connection terminals, three terminals of the input terminal (DRAIN terminal) of the switching element 1 an auxiliary power supply voltage input terminal (VCC terminal), and a GND terminal (SOURCE terminal) acting as the output terminal of the switching element 1.

The transformer 110 has the primary winding 110A, the secondary winding 110B, and the auxiliary winding 110C. The primary winding 110A and the secondary winding 110B are opposite in polarity and the switching power supply is a flyback power supply. The secondary winding 110B and the auxiliary winding 110C have the same polarity, and a voltage generated on the auxiliary winding 110C is proportionate to a voltage generated on the secondary winding 110B. The control circuit 100 detects the output voltage Vo of the secondary side by using the voltage generated on the auxiliary winding 110C.

A rectifying/smoothing circuit including a diode 120 and a capacitance 121 is connected to the auxiliary winding 110C. The rectifying/smoothing circuit is used as the auxiliary power supply voltage generation circuit of the control circuit 100. To be specific, the rectifying/smoothing circuit generates an auxiliary power supply voltage VCC by rectifying and smoothing a pulse voltage generated on the auxiliary winding 110C in response to a switching operation of the switching element 1, and supplies the voltage VCC to the VCC terminal.

A rectifying/smoothing circuit including a diode 130 and a capacitance 131 is connected to the secondary winding 110B. The rectifying/smoothing circuit is used as the output voltage generation circuit of the switching power supply. To be specific, the rectifying/smoothing circuit generates an output voltage Vo by rectifying and smoothing a pulse voltage generated on the secondary winding 110B in response to a switching operation of the switching element 1, and supplies the output voltage Vo to a load 132.

In the control circuit 100, a regulator 2 is connected to the VCC terminal and the DRAIN terminal. The regulator 2 supplies a current from one of the DRAIN terminal and the VCC terminal to an internal circuit power supply VDD of the control circuit 100 and stabilizes the voltage of the internal circuit power supply VDD at a constant value.

In other words, before the start of the switching operation of the switching element 1, the regulator 2 supplies the current from the DRAIN terminal to the internal circuit power supply VDD and simultaneously supplies the current from the DRAIN terminal to the capacitance 121 of the auxiliary power supply voltage generation circuit via the VCC terminal to increase the voltages of the auxiliary power supply VCC and the internal circuit power supply VDD.

After the start of the switching operation of the switching element 1, the regulator 2 stops supplying current from the DRAIN terminal to the VCC terminal. To be specific, when the auxiliary power supply voltage VCC is not lower than the constant value, the regulator 2 supplies, from the VCC terminal to the internal circuit power supply VDD, a current based on the auxiliary power supply voltage VCC. By supplying the circuit current of the control circuit 100 thus from the auxiliary winding 110C, power consumption is effectively reduced.

The VCC terminal acts as a current source of the control circuit 100 and simultaneously acts as a control terminal of feedback control. In other words, the VCC terminal is connected to the regulator 2 and a feedback circuit 3.

The feedback circuit 3 is made up of an OP amplifier 4, a resistor 5a, a resistor 5b, and a resistor 5c. The resistors 5a and 5b divide the voltage of the VCC terminal (auxiliary power supply voltage VCC) and supply the voltage to the inverting input terminal of the OP amplifier 4. The resistor 5c connected between the inverting input terminal and output terminal of the OP amplifier 4 determines the amplification factor of the feedback circuit 3.

The feedback circuit 3 compares the auxiliary power supply voltage VCC and the reference voltage value, generates an error amplification signal VEAO based on a voltage difference, and transmits the signal VEAO to a drain current control circuit 7.

In the switching power supply of auxiliary winding type for performing such PWM control, the peak value of current (drain current) ID passing through the switching element 1 is controlled according to the signal level of the error amplification signal VEAO, so that the output voltage Vo is stabilized.

Moreover, in a switching power supply for performing PFM control, the frequency of a clock signal generated by an oscillator is controlled according to the signal level of an error amplification signal from a feedback circuit to control the oscillatory frequency of a switching element, so that an output voltage Vo is stabilized. To be specific, in the switching power supply for performing PFM control, when a load increases and the signal level of the error amplification signal also increases, the frequency of the clock signal is increased.

A drain current detection circuit 6 detects the current ID passing through the switching element 1, generates an element current detection signal VCL serving as a voltage signal corresponding to the current value, and transmits the signal VCL to a drain current control circuit 7.

The drain current control circuit 7 is fed with an overcurrent protection reference voltage VLIMIT serving as the reference voltage and the error amplification signal VEAO from the feedback circuit 3. Further, when the signal level of the element current detection signal VCL from the drain current detection circuit 6 reaches the lower one of the signal level of the overcurrent protection reference voltage VLIMIT and the signal level of the error amplification signal VEAO, the drain current control circuit 7 generates a signal for determining the turn-off of the switching element 1 and transmits the signal to a latch circuit 9.

An oscillator 8 generates a clock signal having a fixed period for determining the turn-on of the switching element 1 and outputs the clock signal to the latch circuit 9.

The clock signal from the oscillator 8 is supplied as the reset input to the latch circuit 9 and the signal from the drain current control circuit 7 is supplied as the reset input to the latch circuit 9. The latch circuit 9 generates, from the set to the reset, a signal for turning on the switching element 1. In other words, the turn-on of the switching element 1 is controlled by the clock signal from the oscillator 8 and the turn-off of the switching element 1 is controlled by the signal from the drain current control circuit 7.

A gate driver 10 generates a control signal for driving the switching element 1 based on the signal from the latch circuit 9.

A light load intermittent oscillation control circuit 11 stops/restarts the input of the clock signal from the oscillator 8 to the set terminal of the latch circuit 9 according to the signal level of the error amplification signal VEAO from the feedback circuit 3, so that the switching operation of the switching element 1 is stopped/restarted and the switching element 1 is intermittently oscillated.

In other words, when the signal level of the error amplification signal VEAO decreases to a light load detection level VEAO1 at a light load, the light load intermittent oscillation control circuit 11 stops the generation of the clock signal in the oscillator 8 to stop the oscillation of the switching element 1. When the oscillation of the switching element 1 is stopped, the output voltage Vo decreases and the signal level of the error amplification signal VEAO increases. However, the light load detection level has a hysteresis of $\Delta$VEAO and the light load intermittent oscillation control circuit 11 stops the oscillation of the switching element 1 until the signal level of the error amplification signal VEAO reaches "VEAO1 + $\Delta$VEAO". When the signal level of the error amplification signal VEAO reaches "VEAO 1 + $\Delta$VEAO", the light load intermittent oscillation control circuit 11 restarts the generation of the clock signal in the oscillator 8 and restarts the oscillation of the switching element 1. As a result, the switching element 1 is intermittently oscillated at a light load, reducing a switching loss.

However, the load increases even when the voltage of the VCC terminal can be substantially fixed relative to the output current Io in the conventional switching power supply of auxiliary winding feedback type as shown in FIG. 11. As the output current Io increases, the output voltage Vo decreases. Moreover, in the conventional switching power supply of auxiliary winding feedback type, the output voltage Vo rapidly increases during the intermittent oscillation. These problems arise regardless of whether the control is PWM control or PFM control and regardless of whether the mode is the current mode or the voltage mode. The factors of these problems will now be described below.

FIG. 12 shows the waveforms of voltages generated on the secondary winding and the auxiliary winding. When the switching element is turned off, the voltage having a waveform shown in the upper part of FIG. 12 is generated on the secondary winding and the voltage having a waveform shown in the lower part of FIG. 12 is generated on the auxiliary winding. If the secondary-side diode is an ideal device having no resistance components, the voltage generated on the secondary winding has a rectangular wave. However, a voltage drop actually occurs due to the resistance components of the secondary-side diode and thus the voltage generated on the secondary winding has the rectangular waveform shown in the upper part of FIG. 12. The waveform of the voltage generated on the auxiliary winding is proportionate to the voltage generated on the secondary winding.

FIG. 13 shows the waveforms of voltages generated on the secondary winding and the auxiliary winding at a light load and a heavy load in PWM control.

In PWM control, the heavier load, the higher peak of secondary current Id2 passing through the secondary winding. Therefore, a voltage drop $\Delta Vd2$ determined by the product of a resistance component Rd2 of the secondary-side diode and the secondary current Id2 increases with the load.

On the other hand, the circuit current of the control circuit is supplied from the auxiliary winding, and thus the current also passes through the diode on the auxiliary winding side. Therefore, as shown in the lower part of FIG. 13, the voltage VCC having been rectified by the diode on the auxiliary winding side is dropped by $\Delta VCC$ from the peak voltage generated on the auxiliary winding. $\Delta VCC$ is determined by the product of a current Id1 passing through the diode on the auxiliary winding side and a resistance component Rd1 of the diode on the auxiliary winding side.

However, the circuit current of the control circuit is sufficiently small relative to the output current Io of the secondary side and even when the load fluctuates, the peak of the current Id1 passing through the diode on the auxiliary winding side does not fluctuate as greatly as the secondary current Id2. Thus the voltage drop $\Delta VCC$ hardly changes even when the load fluctuates.

In other words, when the load increases, the voltage drop $\Delta VCC$ hardly fluctuates but the voltage drop $\Delta Vd2$ increases. Further, the output voltage Vo has, as shown in the upper part of FIG. 13, a value obtained by subtracting "$\Delta Vd2 + Vf2$" from the peak voltage generated on the secondary winding. "Vf2" represents the forward voltage of the secondary-side diode.

Therefore, in the conventional switching power supply of auxiliary winding feedback type, the switching operation of the switching element is controlled so as to keep constant the voltage of the VCC terminal. Thus when the voltage drop $\Delta VCC$ hardly fluctuates, fluctuations of the voltage drop $\Delta Vd2$ caused by the resistance component of the secondary-side diode are directly reflected on the output voltage Vo, and the output voltage Vo decreases as the output current Io increases.

As described above, in the conventional switching power supply of auxiliary winding feedback type, it is not possible to prevent the output voltage Vo from changing with the load in PWM control, regardless of whether the mode is the current mode or the voltage mode.

PFM control will now be described below. In PFM control, the peak of current passing through the secondary-side diode remains constant regardless of the load, and thus the voltage drop $\Delta Vd2$ caused by the resistance component of the secondary-side diode remains constant regardless of the load.

However, when the load increases and the oscillatory frequency of the switching element increases, an amount of current supplied from the auxiliary winding to the VCC terminal in each period decreases, so that the voltage drop $\Delta VCC$ decreases with the increasing load. In other words, although the voltage of the VCC terminal hardly fluctuates, the peak voltage generated on the auxiliary winding decreases with the increasing load. On the secondary winding, a voltage proportionate to the voltage of the auxiliary winding is generated, and thus the peak voltage generated on the secondary winding decreases with the increasing load. Therefore, as described above, the voltage drop $\Delta Vd2$ caused by the resistance component of the secondary-side diode remains constant regardless of the load, so that the output voltage Vo decreases with the increasing load. The output voltage Vo has a value determined by subtracting "$\Delta Vd2 + Vf2$" from the peak voltage generated on the secondary winding.

As described above, in the conventional switching power supply of auxiliary winding feedback type, it is not possible to prevent the output voltage Vo from fluctuating with the load in PFM control, regardless of whether the mode is the current mode or the voltage mode.

Further, the transformer for power conversion generally has a leakage inductance. The leakage inductance resonates with the parasitic capacitance of the switching element, so that the voltage generated on the auxiliary winding has high-frequency ringing waveforms as shown in the lower parts of FIGS. 12 and 13. Thus the peak of the voltage generated on the auxiliary winding has sharper waveforms. The influence of the leakage inductance is not negligible in the conventional switching power supply of auxiliary winding feedback type.

In other words, both in PWM control and PFM control, the ringing waveform caused by the leakage inductance becomes smaller as the load increases, regardless of whether the mode is the current mode or the voltage mode. Thus the peak voltage generated on the auxiliary winding decreases, so that the peak voltage generated on the secondary winding also decreases and reduces the output voltage Vo.

In the case of intermittent oscillation for reducing a switching loss at a light load, the following problem arises: since the number of oscillations decreases at a light load, the longer oscillation stop period, the larger amount of current supplied from the auxiliary winding to the VCC terminal in each period. Further, the voltage drop $\Delta VCC$ of the diode on the auxiliary winding side increases and the voltage of the VCC terminal decreases. Therefore, in the conventional switching power supply of auxiliary winding feedback type, both in PWM control and PFM control, the output voltage Vo is intended to rapidly increase during oscillation at a light load in order to keep constant the voltage of the VCC terminal, regardless of whether the mode is the current mode or the voltage mode.

Moreover, in the conventional switching power supply of auxiliary winding feedback type, as the load decreases, the ringing waveform caused by the leakage inductance becomes larger. Thus the voltage drop $\Delta VCC$ caused by the resistance component of the diode on the auxiliary winding side increases and the voltage of the VCC terminal decreases, so that the output voltage Vo further rapidly increases.

In order to solve the problem of the output voltage Vo decreasing with the increasing load, Japanese Patent Laid-Open No. 7-170731 discloses a switching power supply of auxiliary winding feedback type for a PWM control method, which will be described below. FIG. 14 is a block diagram showing the switching power supply. The same members as those of FIG. 10 are indicated by the same reference numerals and the explanation thereof is omitted. In the switching power supply of FIG. 14, the internal reference voltage of a feedback circuit 3 is variable.

In FIG. 14, a resistor 29 for detecting a drain current converts a drain current ID to a voltage. A pulse voltage generated by the resistor 29 is supplied to a drain current control circuit 7.

Meanwhile, a resistor 30 and a capacitance 31 smooth the pulse voltage generated by the resistor 29 for detecting a drain current, and supply the voltage to an OP amplifier 32. The OP amplifier 32 amplifies a voltage signal generated by the resistor 29 to a predetermined multiple and transmits the signal to a reference voltage variable circuit 13.

The reference voltage variable circuit 13 changes the internal reference voltage of the feedback circuit 3 in response to the signal from the OP amplifier 32. To be specific, when the load and the drain current ID increase, the reference voltage variable circuit 13 increases the internal reference voltage of the feedback circuit 3. When the internal reference voltage of the feedback circuit 3 increases, an error amplification signal VEAO falls, the peak value of the drain current ID decreases, and the peak of current passing through a diode 130 on the secondary side decreases. This operation prevents an output voltage Vo from decreasing at a heavy load.

In this conventional switching power supply, however, when using an output voltage control method such as the PFM control method having a constant drain current, it is not possible to obtain the effect of correcting the output voltage Vo.

Further, an extremely high capacitance value is necessary for the capacitance 31 for smoothing the signal having been converted to a voltage by the resistor 29 for detecting a drain current. Thus when a control circuit 100 is formed on the same semiconductor chip, the capacitance 31 is added as an external component, thereby increasing the cost and interfering with miniaturization.

The operation of increasing the internal reference voltage of the feedback circuit according to an increase of the load is equivalent to the operation of reducing the peak value of the drain current ID according to an increase of the load. This operation is contradictory to the original control performed by the feedback circuit 3. Thus the conventional switching power supply cannot stably control the output voltage Vo when the load rapidly fluctuates.

DISCLOSURE OF THE INVENTION

In view of the problems, an object of the present invention is to provide a switching power supply of auxiliary winding feedback type for achieving small fluctuations in output voltage and constant voltage control with high accuracy, the output voltage fluctuating with load.

In order to attain the object, the switching power supply of the present invention detects the magnitude of a load based on a pulse voltage generated on an auxiliary winding and controls the internal reference voltage value of a feedback circuit according to the magnitude of the load.

To be specific, a first switching power supply of the present invention includes a transformer having a primary winding, a secondary winding, and an auxiliary winding, a switching element for switching a DC voltage supplied to the primary winding and generating a pulse voltage on the secondary winding and the auxiliary winding, an output voltage generation circuit for supplying an output voltage to a load, the output voltage being generated by rectifying and smoothing the pulse voltage generated on the secondary winding, a rectifying/smoothing circuit for generating a feedback voltage by rectifying and smoothing the pulse voltage generated on the auxiliary winding, and a control circuit for controlling the driving of the switching element, wherein the control circuit includes a feedback circuit for comparing the voltage value of the feedback voltage with the reference voltage value to generate an error signal, a load detection circuit for generating a load detection signal having a signal level corresponding to the magnitude of the load based on the pulse voltage generated on the auxiliary winding, a reference voltage variable circuit for controlling the reference voltage value of the feedback circuit based on the load detection signal, and a switching control circuit for controlling the on/off of the switching element by means of the error signal.

Further, in order to attain the object, the switching power supply of the present invention detects the magnitude of the load based on the pulse voltage generated on the auxiliary winding and controls the feedback voltage according to the magnitude of the load.

A second switching power supply of the present invention includes a transformer having a primary winding, a secondary winding, and an auxiliary winding, a switching element for switching a DC voltage supplied to the primary winding and generating a pulse voltage on the secondary winding and the auxiliary winding, an output voltage generation circuit for supplying an output voltage to a load, the output voltage being generated by rectifying and smoothing the pulse voltage generated on the secondary winding, a rectifying/smoothing circuit for generating a feedback voltage by rectifying and smoothing the pulse voltage generated on the auxiliary winding, and a control circuit for controlling the driving of the switching element, wherein the control circuit includes a feedback circuit for generating an error signal based on the voltage value of the feedback voltage, a load detection circuit for generating a load detection signal having a signal level corresponding to the magnitude of the load based on the pulse voltage generated on the auxiliary winding, a feedback voltage variable circuit for controlling the feedback voltage based on the load detection signal, and a switching control circuit for controlling the on/off of the switching element by means of the error signal.

Moreover, in order to attain the object, the switching power supply of the present invention detects the magnitude of the load based on the pulse voltage generated on the auxiliary winding and controlling, according to the magnitude of the load, the value of current passing through the rectifying/smoothing circuit for generating the feedback voltage.

A third switching power supply of the present invention includes a transformer having a primary winding, a secondary winding, and an auxiliary winding, a switching element for switching a DC voltage supplied to the primary winding and generating a pulse voltage on the secondary winding and the auxiliary winding, an output voltage generation circuit for supplying an output voltage to a load, the output voltage being generated by rectifying and smoothing the pulse voltage generated on the secondary winding, a rectifying/smoothing circuit for generating a feedback voltage by rectifying and smoothing the pulse voltage generated on the auxiliary winding, and a control circuit for controlling the driving of the switching element, wherein the control circuit includes a feedback circuit for comparing the voltage value of the feedback voltage with the reference voltage value to generate an error signal, a load detection circuit for generating a load detection signal having a signal level corresponding to the magnitude of the load based on the pulse voltage generated on the auxiliary winding, an auxiliary winding current variable circuit for controlling, based on the load detection signal, current passing through the rectifying/smoothing circuit, and a switching control circuit for controlling the on/off of the switching element by means of the error signal.

Further, in order to attain the object, the switching power supply of the present invention includes the rectifying/smoothing circuit for generating the feedback voltage by rectifying and smoothing the pulse voltage generated on the auxiliary winding, in addition to an auxiliary power supply voltage generation circuit for generating an auxiliary power supply voltage by rectifying and smoothing the pulse voltage generated on the auxiliary winding. The switching power supply controls the switching operation of the switching element based on the feedback voltage from the rectifying/smoothing circuit.

A fourth switching power supply of the present invention, according to the first to third switching power supplies, further includes the auxiliary power supply voltage generation circuit for generating the auxiliary power supply voltage by rectifying and smoothing the pulse voltage generated on the auxiliary winding, the auxiliary power supply voltage generation circuit being connected to the auxiliary winding in parallel with the rectifying/smoothing circuit, and the control circuit further includes a regulator for supplying a current to an internal circuit power supply based on the auxiliary power supply voltage and keeping the voltage of the internal circuit power supply at a constant value.

According to the present invention, high-precision constant voltage control can be achieved with small fluctuations in the output voltage without using a photocoupler and a secondary-side output voltage detection circuit in the switching power supply of auxiliary winding feedback type, the output voltage fluctuating with load. The high-precision constant voltage control can be achieved regardless of a control method for stabilizing the output voltage of the switching power supply and regardless of a mode for controlling the driving of the switching element based on a pulse. The control method includes PWM control and PFM control and the mode includes voltage mode and current mode.

Moreover, the present invention separately includes the rectifying/smoothing circuit for generating the feedback voltage from the pulse voltage generated on the auxiliary winding and the rectifying/smoothing circuit (auxiliary power supply voltage generation circuit) for generating the auxiliary power supply voltage from the pulse voltage generated on the auxiliary winding, thereby minimizing current passing through the rectifying/smoothing circuit for generating the feedback voltage. Thus high-precision constant voltage control can be achieved even in intermittent oscillation control and control with varying frequency.

DESCRIPTION OF THE EMBODIMENTS

As an example of a switching power supply according to an embodiment of the present invention, a switching power supply of auxiliary winding feedback type for performing PWM control in current mode will now be described below. The present invention can be implemented in a switching power supply of auxiliary winding feedback type regardless of a control method for stabilizing the output voltage of the switching power supply and regardless of a mode for controlling the driving of a switching element based on a pulse. The control method includes PWM control and PFM control and the mode includes voltage mode and current mode.

Embodiment 1

Figure 1:
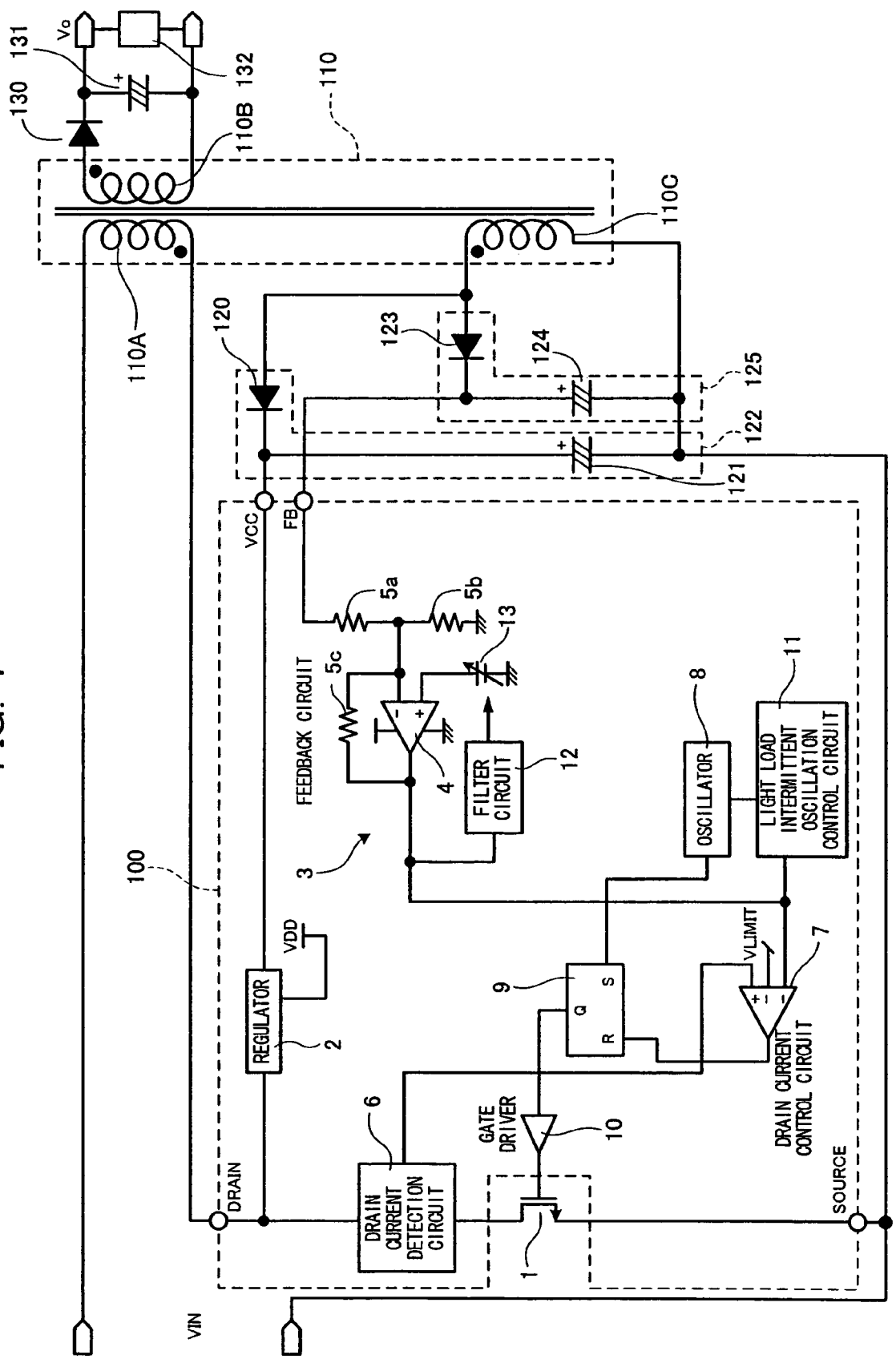
FIG. 1 is a block diagram showing a structural example of a switching power supply according to Embodiment 1 of the present invention.

A switching power supply according to Embodiment 1 of the present invention will now be described below with reference to the accompanying drawings. FIG. 1 is a block diagram showing a structural example of the switching power supply according to Embodiment 1 of the present invention.

In FIG. 1, a switching element 1 is a power MOSFET. The switching element 1 has three terminals of a DRAIN terminal acting as an input terminal, a SOURCE terminal acting as an output terminal, and a GATE terminal acting as a control terminal. The switching element 1 oscillates so as to electrically couple or decouple the input terminal and the output terminal in response to a control signal received on the control terminal. Further, the switching element 1 switches, according to the oscillating operation (switching operation), a DC voltage supplied to a primary winding 110A of a transformer 110 for power conversion. By the switching operation of the switching element 1, a pulse voltage is generated on a secondary winding 110B and an auxiliary winding 110C.

A control circuit 100 is formed on the same semiconductor substrate. The control circuit 100 generates the control signal to control the switching operation (oscillating operation) of the switching element 1. Further, the control circuit 100 has, as external connection terminals, four terminals of the input terminal (DRAIN terminal) of the switching element 1, an auxiliary power supply voltage input terminal (VCC terminal), a feedback terminal (FB terminal), and a GND terminal (SOURCE terminal) also acting as the output terminal of the switching element 1.

The transformer 110 includes the primary winding 110A, the secondary winding 110B, and the auxiliary winding 110C. The primary winding 110A and the secondary winding 110B are opposite in polarity and the switching power supply is a flyback power supply. The secondary winding 110B and the auxiliary winding 110C have the same polarity and a voltage generated on the auxiliary winding 110C is proportionate to a voltage generated on the secondary winding 110B. The control circuit 100 detects an output voltage Vo of the secondary side by using the voltage generated on the auxiliary winding 110C.

A first rectifying/smoothing circuit 122 including a diode 120 and a capacitance 121 is connected to the auxiliary winding 110C. The rectifying/smoothing circuit 122 is used as the auxiliary power supply voltage generation circuit of the control circuit 100. To be specific, the rectifying/smoothing circuit 122 generates an auxiliary power supply voltage VCC by rectifying and smoothing the pulse voltage generated on the auxiliary winding 110C in response to a switching operation of the switching element 1, and supplies the voltage VCC to the VCC terminal.

A second rectifying/smoothing circuit 125 including a diode 123 and a capacitance 124 is connected to the auxiliary winding 110C. The first rectifying/smoothing circuit 122 and the second rectifying/smoothing circuit 125 are connected in parallel. The rectifying/smoothing circuit 125 generates a feedback voltage FB by rectifying and smoothing the pulse voltage generated on the auxiliary winding 110C, and supplies the voltage FB to the FB terminal.

A rectifying/smoothing circuit including a diode 130 and a capacitance 131 is connected to the secondary winding 110B. The rectifying/smoothing circuit is used as the output voltage generation circuit of the switching power supply. To be specific, the rectifying/smoothing circuit generates the output voltage Vo by rectifying and smoothing the pulse voltage generated on the secondary winding 110B in response to a switching operation of the switching element 1, and supplies the output voltage Vo to a load 132.

In the control circuit 100, a regulator 2 is connected to the VCC terminal and the DRAIN terminal. The regulator 2 supplies a current from one of the DRAIN terminal and the VCC terminal to an internal circuit power supply VDD of the control circuit 100 and stabilizes the voltage of the internal circuit power supply VDD at a constant value.

To be specific, before the start of the switching operation of the switching element 1, the regulator 2 supplies current from the DRAIN terminal to the internal circuit power supply VDD and simultaneously supplies current from the DRAIN terminal to the capacitance 121 of the auxiliary power supply voltage generation circuit via the VCC terminal, so that the auxiliary power supply voltage VCC and the voltage of the internal circuit power supply VDD are increased.

After the start of the switching operation of the switching element 1, the regulator 2 stops supplying current from the DRAIN terminal to the VCC terminal. To be specific, when the auxiliary power supply voltage VCC is not lower than the constant value, the regulator 2 supplies current from the VCC terminal to the internal circuit power supply VDD based on the auxiliary power supply voltage VCC. The supply of the circuit current of the control circuit 100 from the auxiliary winding 110C is effective for power consumption reduction.

The FB terminal acts as a control terminal of feedback control and a feedback circuit 3 is connected to the FB terminal. The feedback circuit 3 is made up of an OP amplifier 4, a resistor 5a, a resistor 5b, and a resistor 5c. The resistors 5a and 5b divide the voltage of the FB terminal (feedback voltage FB) and supply the voltage to the inverting input terminal of the OP amplifier 4. The resistor 5c connected between the inverting input terminal and output terminal of the OP amplifier 4 determines the amplification factor of the feedback circuit 3.

The feedback circuit 3 compares the feedback voltage FB and the reference voltage value, generates an error amplification signal VEAO (error signal) based on the voltage difference, and transmits the signal VEAO to a drain current control circuit 7.

The switching power supply controls, according to the signal level of the error amplification signal VEAO, the peak value of a drain current ID passing through the switching element 1, so that the output voltage Vo is stabilized.

When the switching power supply is operated in PFM control, the switching power supply controls, according to the signal level of the error amplification signal from the feedback circuit, the frequency of a clock signal generated by an oscillator to control the oscillation frequency of the switching element 1, so that the output voltage Vo is stabilized. To be specific, when a load and the signal level of the error amplification signal increase, the frequency of the clock signal is increased.

A drain current detection circuit (element current detection circuit) 6 detects the drain current ID passing through the switching element 1, generates an element current detection signal VCL acting as a voltage signal corresponding to the current value, and transmits the signal VCL to a drain current control circuit (element current control circuit) 7.

The drain current control circuit 7 is fed with an overcurrent protection reference voltage VLIMIT (overcurrent protection reference signal) serving as the reference voltage and the error amplification signal VEAO supplied from the feedback circuit 3. Further, when the signal level of the element current detection signal VCL from the drain current detection circuit 6 reaches the lower one of the signal levels of the overcurrent protection reference voltage VLIMIT and the error amplification signal VEAO, the drain current control circuit 7 generates a signal for determining the turn-off of the switching element 1 and transmits the signal to a first latch circuit 9.

An oscillator 8 generates a clock signal having a fixed period for determining the turn-on of the switching element 1 and outputs the clock signal to the first latch circuit 9.

The clock signal from the oscillator 8 is supplied as the set input to the first latch circuit 9 and the signal from the drain current control circuit 7 is supplied as the reset input to the first latch circuit 9. The first latch circuit 9 generates, from the set to the reset, a signal for turning on the switching element 1. In other words, the turn-on of the switching element 1 is controlled by the clock signal from the oscillator 8 and the turn-off of the switching element 1 is controlled by the signal from the drain current control circuit 7.

A gate driver 10 generates the control signal for driving the switching element 1 based on the signal from the first latch circuit 9.

In this configuration, a switching control circuit for controlling, by using the error amplification signal VEAO, the on/off of the switching element 1 is made up of the drain current detection circuit 6, the drain current control circuit 7, the oscillator 8, the first latch circuit 9, and the gate driver 10.

A light load intermittent oscillation control circuit 11 stops/restarts the input of the clock signal from the oscillator 8 to the set terminal of the first latch circuit 9 according to the signal level of the error amplification signal VEAO from the feedback circuit 3, so that the switching operation of the switching element 1 is stopped/restarted and intermittently oscillated.

To be specific, when the signal level of the error amplification signal VEAO decreases to a light load detection level VEAO1 at a light load, the light load intermittent oscillation control circuit 11 stops the generation of the clock signal in the oscillator 8 to stop the oscillation of the switching element 1. When the oscillation of the switching element 1 is stopped, the output voltage Vo decreases and the signal level of the error amplification signal VEAO increases. A light load detection level has a hysteresis of ?VEAO and the light load intermittent oscillation control circuit 11 stops the oscillation of the switching element 1 until the signal level of the error amplification signal VEAO reaches "VEAO1+?VEAO". When the signal level of the error amplification signal VEAO reaches "VEAO1+?VEAO", the light load intermittent oscillation control circuit 11 restarts the generation of the clock signal in the oscillator 8 and restarts the oscillation of the switching element 1. As a result, at a light load, the operation of the switching element 1 is an intermittent oscillation, thereby reducing a switching loss.

In Embodiment 1, the feedback circuit 3 also acts as a load detection circuit for generating a load detection signal having a signal level corresponding to the magnitude of the load 132 according to the pulse voltage generated on the auxiliary winding 110C, and the error amplification signal VEAO acts as the load detection signal.

A filter circuit 12 connected to the output terminal of the feedback circuit 3 extracts a low-frequency component from the error amplification signal VEAO acting as the load detection signal, and the filter circuit 12 transmits the signal to a reference voltage variable circuit 13 connected to the non-inverting input terminal of the feedback circuit 3.

The reference voltage variable circuit 13 controls the internal reference voltage of the feedback circuit 3 based on the low-frequency component (the output signal of the filter circuit 12) of the error amplification signal VEAO (load detection signal). The low-frequency component is supplied through the filter circuit 12. To be specific, when the signal level of the error amplification signal VEAO increases with the load (when the output signal level of the filter circuit 12 increases), the reference voltage variable circuit 13 sets a high internal reference voltage for the feedback circuit 3. Conversely, when the output signal level of the filter circuit 12 decreases, the reference voltage variable circuit 13 sets a low internal reference voltage for the feedback circuit 3.

In the switching power supply configured thus, when the load increases, the peak value of the drain current ID passing through the switching element 1 increases with the signal level of the error amplification signal VEAO due to the feedback action of the feedback circuit 3.

Meanwhile, the switching power supply increases the internal reference voltage of the feedback circuit 3 according to the increase of the load. When the internal reference voltage increases, the signal level of the error amplification signal VEAO is lowered. Thus the peak value of the drain current ID decreases and the peak of a secondary current Id passing through the secondary-side diode 130 also decreases. It is therefore possible to prevent the output voltage Vo from decreasing at a heavy load.

According to the switching power supply configured thus, also in PFM control, the internal reference voltage of the feedback circuit 3 increases with the load, the signal level of the error amplification signal is lowered, and the oscillation frequency decreases, so that the peak voltage generated on the secondary winding increases. It is therefore possible to prevent the output voltage Vo from decreasing at a heavy load.

The actions of the reference voltage variable circuit 13 and the feedback circuit 3 seem like contradictory operations. However, the actions do not cause unstable operations because the filter circuit 12 extracts only a signal having a sufficiently low frequency relative to the operating frequency of the feedback circuit 3.

Further, the reference voltage variable circuit 13 controls the internal reference voltage of the feedback circuit 3 based on the low-frequency component of the signal (load detection signal) generated by the feedback circuit 3, so that the reference voltage variable circuit 13 effectively operates both in PWM control and PFM control.

Moreover, in the switching power supply, the VCC terminal and the FB terminal are provided and the rectifying/smoothing circuit connected to the auxiliary winding 110C is divided into the first rectifying/smoothing circuit 122 for supplying power to the control circuit 100 and the second rectifying/smoothing circuit 125 for detecting secondary-side output voltage. With this configuration, the diode 123 included in the second rectifying/smoothing circuit 125 for detecting secondary-side output voltage is separated from the internal circuit power supply VDD (regulator 2), thereby minimizing a current passing through the diode 123. In the case where the VCC terminal acts as the current source of the control circuit and simultaneously acts as the control terminal for feedback control, current passes through the diode connected to the VCC terminal and causes the output voltage Vo to fluctuate with load. In contrast, in Embodiment 1, current passing through the diode 123 included in the second rectifying/smoothing circuit 125 for detecting secondary-side output voltage is minimized as described above, thereby reducing fluctuations in the output voltage Vo that fluctuates with the load. Further, it is possible to reduce a rapid increase of the output voltage Vo during an intermittent oscillation.

Figure 2:
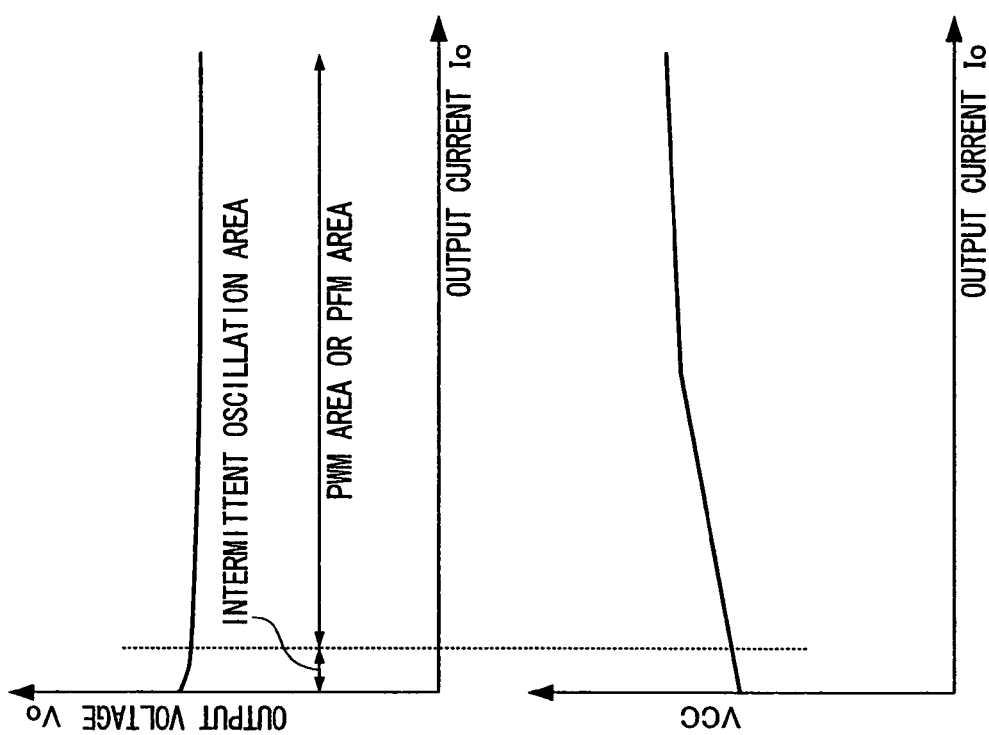
FIG. 2 shows the characteristics of an output voltage Vo and the voltage of a VCC terminal relative to an output current Io of the switching power supply according to Embodiment 1 of the present invention.

FIG. 2 shows the characteristics of the output voltage Vo and the voltage of the VCC terminal relative to the output current Io of the switching power supply according to Embodiment 1 of the present invention. As shown in FIG. 2, in the switching power supply, it is possible to prevent the output voltage Vo from decreasing at a heavy load and keep the output voltage Vo nearly constant relative to the output current Io. Further, in the switching power supply, it is possible to reduce a rapid increase of the output voltage Vo during an intermittent oscillation as shown in FIG. 2.

However, the circuit current of the control circuit is sufficiently small relative to the output current Io on the secondary side, and thus the auxiliary power supply voltage VCC of the VCC terminal operates like the feedback voltage FB of the FB terminal. Therefore, the voltage of the VCC terminal increases with the increase of the load and the output current Io.

Embodiment 2

Figure 3:
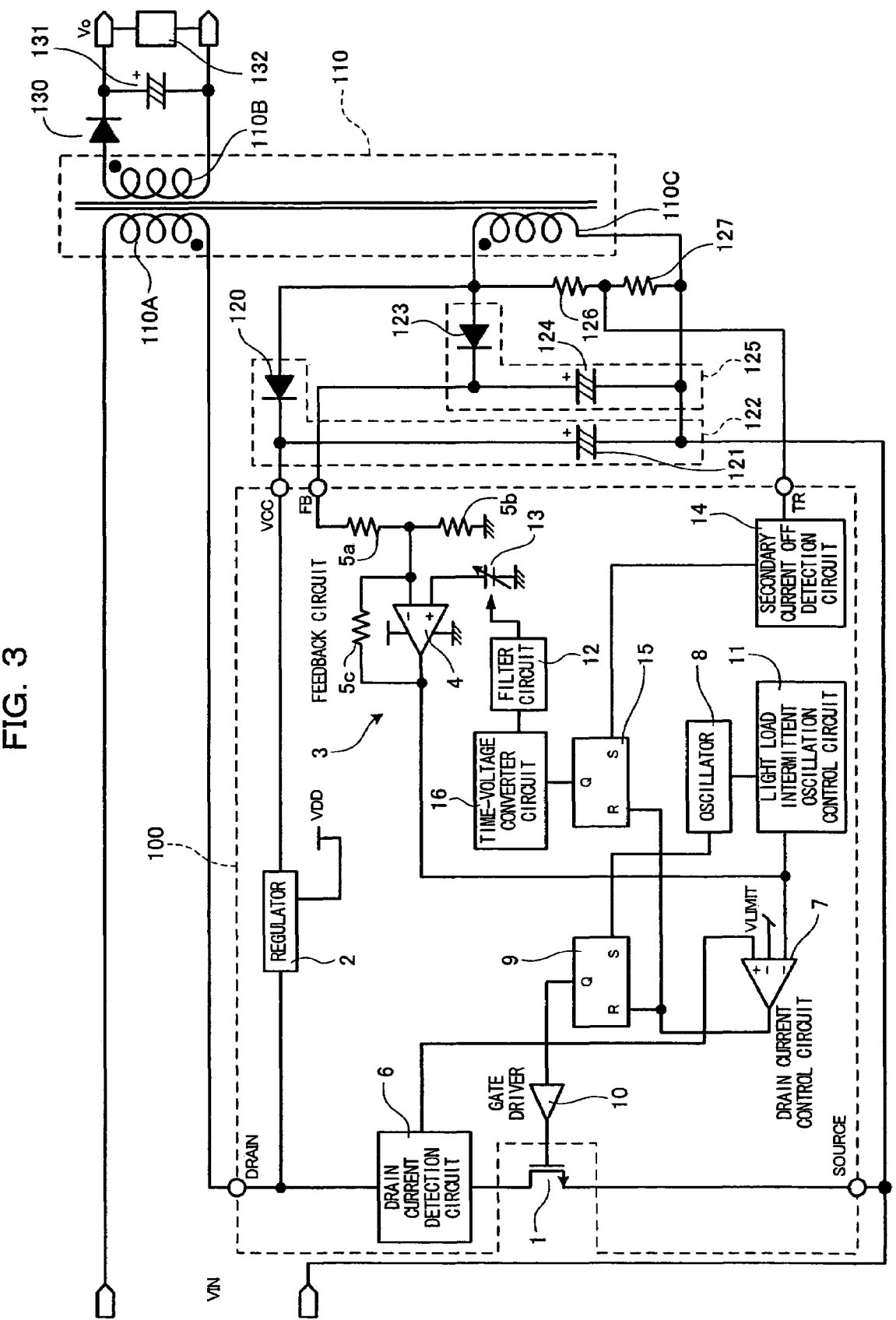
FIG. 3 is a block diagram showing a structural example of a switching power supply according to Embodiment 2 of the present invention.

A switching power supply according to Embodiment 2 of the present invention will now be described below with reference to the accompanying drawings. FIG. 3 is a block diagram showing a structural example of the switching power supply according to Embodiment 2 of the present invention. The same members as those of Embodiment 1 are indicated by the same reference numerals and the explanation thereof is omitted.

In FIG. 3, a control circuit 100 further includes a TR terminal as an external connection terminal. Moreover, the control circuit 100 includes a secondary current off detection circuit 14, a second latch circuit 15, and a time-voltage converter circuit 16. In Embodiment 2, a load detection circuit is made up of the secondary current off detection circuit 14, the second latch circuit (secondary current on time detection circuit) 15, and the time-voltage converter circuit 16. The load detection circuit generates a load detection signal at a signal level corresponding to the magnitude of a load 132 based on a pulse voltage generated on an auxiliary winding Further, resistors 126 and 127 are connected to the auxiliary winding 110C in parallel with first and second rectifying/smoothing circuits 122 and 125. The resistors 126 and 127 divide the pulse voltage generated on the auxiliary winding 110C and supply the voltage to the TR terminal. The secondary current off detection circuit 14 is connected to the TR terminal.

The secondary current off detection circuit 14 detects the timing of the end of the passage of a secondary current Id2 according to a predetermined threshold value. To be specific, when a switching element 1 is turned off, the secondary current Id2 passes through a secondary winding 110B and a pulse voltage is generated on the auxiliary winding 110C. At the end of the passage of the secondary current Id2, the voltage of the auxiliary winding 110C starts decreasing. Therefore, the secondary current off detection circuit 14 detects the timing of the end of the passage of the secondary current Id2 by detecting the timing of the decrease of the voltage of the auxiliary winding 110C (the voltage of the TR terminal). Further, the secondary current off detection circuit 14 generates a secondary current off detection signal indicating the timing of the end of the passage of the secondary current Id2.

The set terminal of the second latch circuit 15 is fed with the secondary current off detection signal from the secondary current off detection circuit 14. Meanwhile, the reset terminal of the second latch circuit 15 is fed with a signal from a drain current control circuit 7. The signal determines the turn-off of the switching element 1. Based on these signals, the second latch circuit 15 generates a secondary current on time detection signal. The secondary current on time detection signal is set at a low level (first signal level) in a period during which the secondary current Id2 passes through the secondary winding 110B (hereinafter, referred to as a time T2 on) and set at a high level (second signal level) in a period during which the secondary current Id2 does not pass through the secondary winding 110B (hereinafter, referred to as a time T2off).

The time-voltage converter circuit 16 generates a load detection signal based on the secondary current on time detection signal from the second latch circuit 15. The load detection signal has a signal level corresponding to the time T2 on. To be specific, when the time T2 on is long, the time-voltage converter circuit 16 generates a load detection signal of a high voltage level. When the time T2 on is short, the time-voltage converter circuit 16 generates a load detection signal of a low voltage level. Further, the time-voltage converter circuit 16 holds the generated load detection signal in a period of the switching operation of the switching element 1 and updates the load detection signal in each period.

The load detection signal from the time-voltage converter circuit 16 is supplied through the filter circuit 12 to a reference voltage variable circuit 13 connected to the non-inverting input terminal of the feedback circuit 3.

In an ideal model, the time T2 on and a secondary-side output voltage Vo have the following relationship:

[Formula 1] (1)

where an output current Io is represented by an average of the secondary current Id2 passing through the diode 130, $I_{2p}$ represents the peak value of the secondary current Id2, and T represents an oscillation period.

When the energy on the primary side is converted to energy on the secondary side with an efficiency η, the following relationship is established:

[Formula 2] (2)

where L represents the inductance of a transformer 110, Ilimit represents the peak value of a drain current ID passing through the switching element 1, and fosc represents an oscillatory frequency.

Further, the following relationship is established:

[Formula 3] (3)

where n represents the turns ratio of the transformer 110.

Based on Formulas (2) and (3), the following relationship is established:

[Formula 4] (4)

In this way, the time T2 on is represented by the efficiency η and the output voltage Vo in addition to the peak value Ilimit of the drain current ID.

Therefore, when the output current Io increases with an increase of the load and the output voltage Vo decreases, the time T2 on increases as indicated by Formula (4). Also in the case of the switching power supply operated by PFM control, when the load increases, the secondary current Id2 has a nearly constant peak value but the time T2 on increases.

When the time T2 on increases, the voltage level of the load detection signal from the time-voltage converter circuit 16 rises and the internal reference voltage of the feedback circuit 3 increases. Thus, as in Embodiment 1, it is possible to prevent the output voltage Vo from decreasing at a heavy load both in PWM control and PFM control.

Further, as indicated by Formula (4), the time T2 on is represented by the peak value Ilimit of the drain current ID, the efficiency η, and the output voltage Vo. Thus as compared with the switching power supply of Embodiment 1 for correcting the internal reference voltage of the feedback circuit 3 in response to the signal (error amplification signal VEAO) from the feedback circuit 3, the switching power supply of Embodiment 2 can achieve control more reflecting the output of the secondary side.

Figure 4:
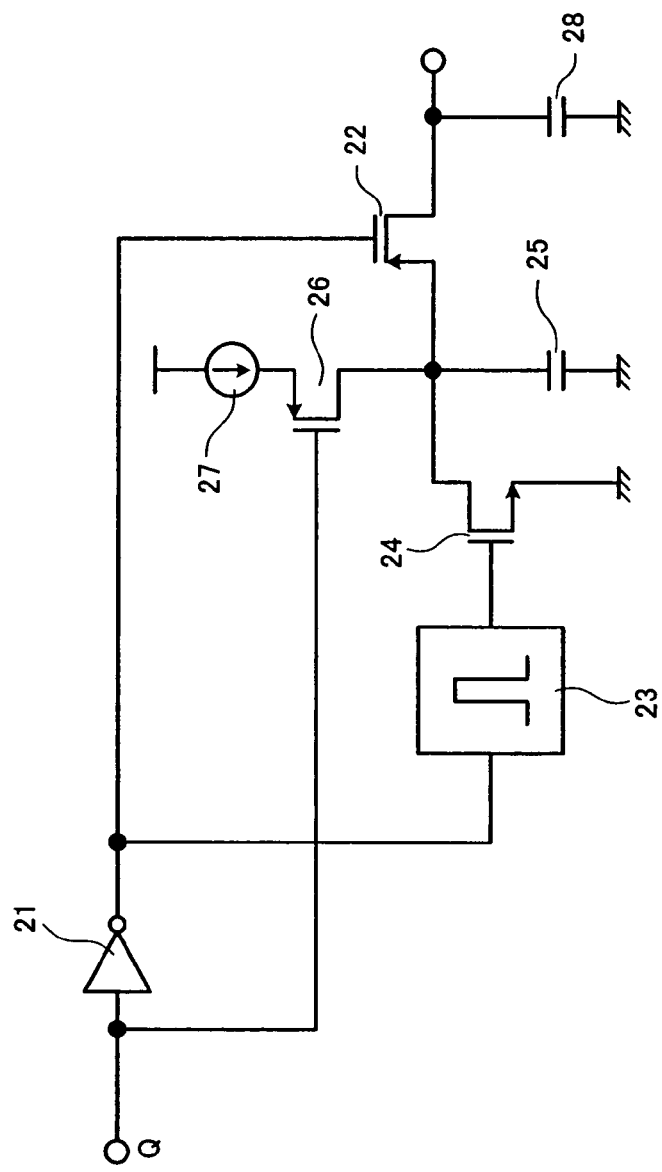
FIG. 4 shows a structural example of a time-voltage converter circuit included in the switching power supply according to Embodiment 2 of the present invention.

FIG. 4 shows a structural example of the time-voltage converter circuit 16 for converting the time T2 on to a voltage level. In FIG. 4, an input terminal Q is fed with the secondary current on time detection signal from the second latch circuit 15.

The input terminal of an inverter 21 is connected to the input terminal Q. A signal generated by the inverter 21 is supplied to a first switch 22 and a pulse generator circuit 23. The first switch (PchMOSFET) 22 is turned on in the time T2off during which the signal generated by the second latch circuit 15 is set at a high level and the signal generated by the inverter 21 is set at a low level. Further, the pulse generator circuit 23 generates a pulse when the switching element 1 is turned off (when the passage of the secondary current Id2 is started, the signal generated by the second latch circuit 15 s set at a low level, and the signal generated by the inverter 21 rises to a high level).

A discharge circuit (NchMOSFET) 24 is connected to a first capacitance 25. The discharge circuit 24 receives a pulse from the pulse generator circuit 23, and the discharge circuit 24 discharges the first capacitance 25 when the switching element 1 is turned off. In other words, the first capacitance 25 is reset in each period.

In this configuration, a constant current circuit supplies a constant current to the first capacitance 25 in a period (time T2 on) during which the secondary current Id2 flows, and the constant current circuit is made up of a second switch (PchMOSFET) 26 and a constant current source 27. To be specific, the second switch 26 so controlled as to open/close in response to the signal supplied to the input terminal Q is connected between the first capacitance 25 and the constant current source 27, and the second switch 26 controls the charging of the first capacitance 25 by means of the constant current source 27. In other words, in the time T2 on during which the signal generated by the second latch circuit 15 is set at a low level, the second switch 26 is turned on and supplies a constant current to the first capacitance 25 to charge the first capacitance 25. Thus the peak voltage of the first capacitance 25 increases with the time T2 on.

A second capacitance 28 for generating the load detection signal is connected to the first capacitance 25 via the first switch 22. The first switch 22 is a conducting circuit that is turned on during the time T2off. The first switch 22 brings the first capacitance 25 and the second capacitance 28 into conduction at the same potential. Thus the second capacitance 28 holds the peak voltage of the first capacitance 25 in each period.

As described above, in each switching operation of the switching element 1, the time-voltage converter circuit 16 of FIG. 4 sets the voltage level of the second capacitance 28 having a voltage level corresponding to the length of a period (time Ton) during which the secondary current Id2 flows, and the time-voltage converter circuit 16 outputs the voltage level as the load detection signal. Further, in a period of the switching operation of the switching element 1, the voltage level (load detection signal) of the second capacitance 28 is kept, the first capacitance 25 is reset in each period, and the voltage level (load detection signal) of the second capacitance 28 is updated.

Figure 5:
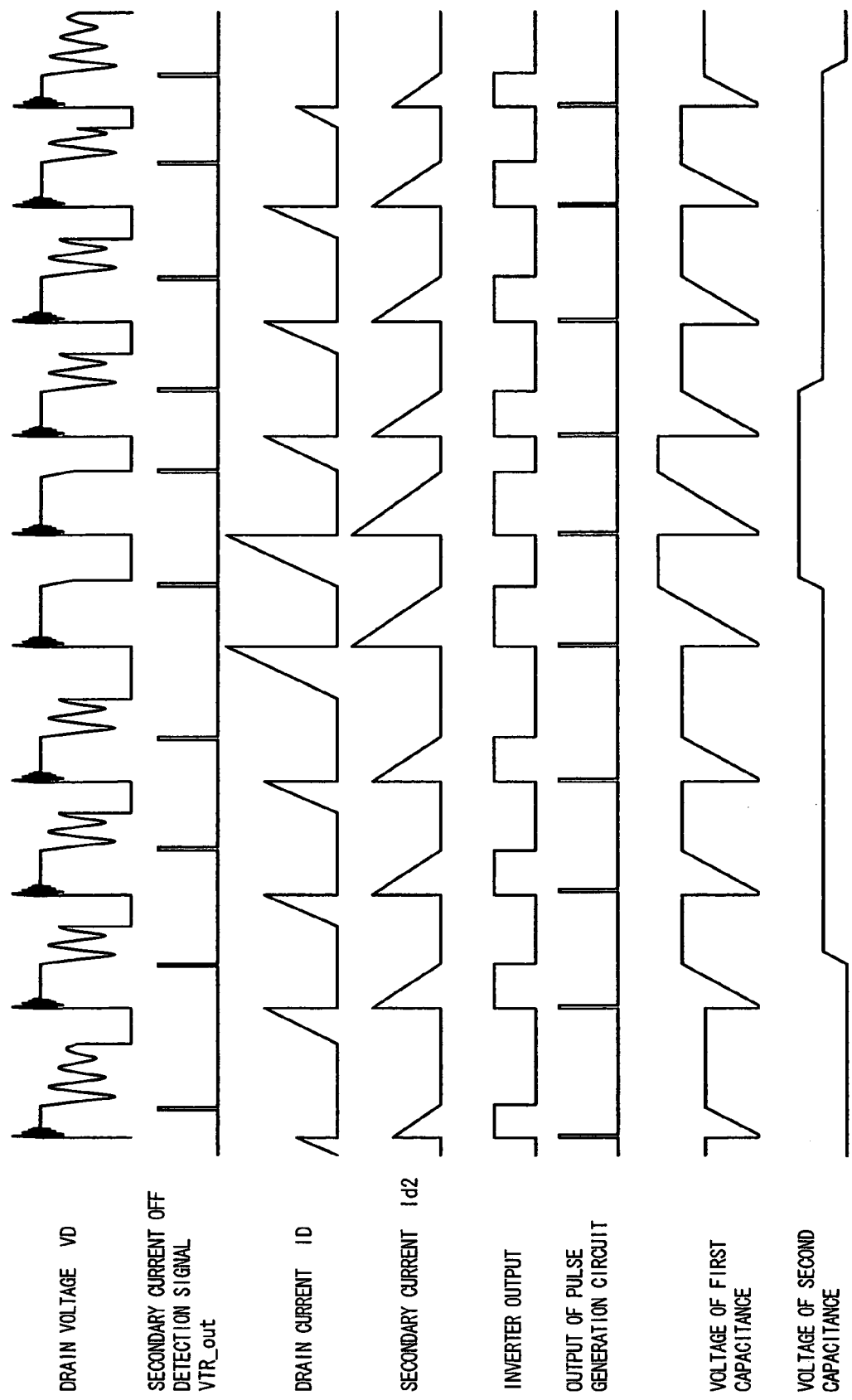
FIG. 5 is a waveform chart showing the parts of the switching power supply according to Embodiment 2 of the present invention.

FIG. 5 is a waveform chart showing the parts of the switching power supply according to Embodiment 2 of the present invention. Referring to FIG. 5, the following will discuss the operations of the time-voltage converter circuit 16 shown in FIG. 4. FIG. 5 shows, from above, the waveform of a drain voltage VD generated on the DRAIN terminal, the waveform of a secondary current off detection signal VTR_out generated by the secondary current off detection circuit 14, the waveform of the drain current ID passing through the switching element 1, the waveform of the secondary current Id2 passing through the diode 130 on the secondary side, the waveform of the signal generated by the inverter 21 in the time-voltage converter circuit 16, the waveform of the signal generated by the pulse generator circuit 23 in the time-voltage converter circuit 16, the voltage waveform of the first capacitance 25 in the time-voltage converter circuit 16, and the voltage waveform of the second capacitance 28 (the waveform of the load detection signal) in the time-voltage converter circuit 16.

When current passes through the switching element 1 and then the switching element 1 is turned off, the drain voltage VD is generated and the secondary current Id2 simultaneously passes through the diode 130 on the secondary side. At the end of the passage of the secondary current Id2, the drain voltage VD starts decreasing. A waveform proportionate to the drain voltage VD is generated for the auxiliary winding 110C. The secondary current off detection circuit 14 detects the timing of the start of the decrease of the drain voltage VD and generates the secondary current off detection signal VTR_out.

The second latch circuit 15 is fed with a signal for determining the turn-off of the switching element 1 and the secondary current off detection signal VTR_out from the secondary current off detection circuit 14. The inverter 21 generates the signal that is set at a high level only in the period (time T2 on) during which the secondary current Id2 passes through the diode 130 on the secondary side.

The pulse generator circuit 23 generates a pulse at the rising edge of the signal generated by the inverter 21. In other words, the pulse generator circuit 23 generates the pulse when the switching element 1 is turned off. The first capacitance 25 is charged with a constant current during the time T2 on. The charging is stopped at the end of the passage of the secondary current Id2.

The first switch 22 brings the first capacitance 25 and the second capacitance 28 into conduction at the same potential in the time T2off during which the secondary current Id2 does not flow. The first capacitance 25 is discharged by the discharge circuit 24 in each period. Thus the voltage waveform of the first capacitance 25 is shaped like a sawtooth wave obtained by resetting the voltage every time the switching element 1 is turned off. The voltage waveform of the second capacitance 28 is obtained by extracting the peak voltage of the first capacitance 25.

In this way, the time-voltage converter circuit 16 generates the load detection signal having a voltage level corresponding to the time T2 on (the voltage level of the second capacitance 28) and controls the internal reference voltage of the feedback circuit 3.

Embodiment 3

Figure 6:
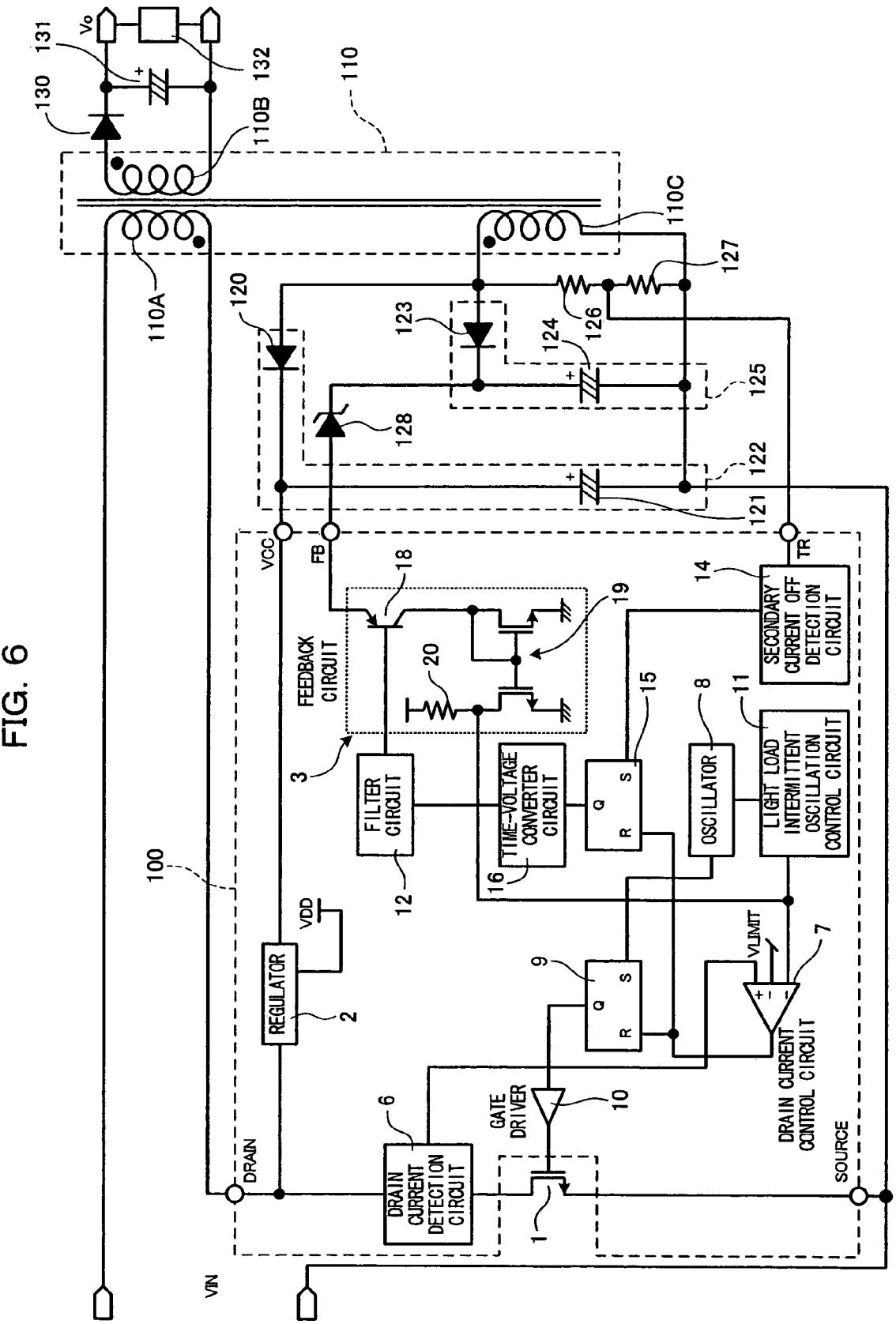
FIG. 6 is a block diagram showing a structural example of a switching power supply according to Embodiment 3 of the present invention.

A switching power supply according to Embodiment 3 of the present invention will now be described below with reference to the accompanying drawings. FIG. 6 is a block diagram showing a structural example of the switching power supply according to Embodiment 3 of the present invention. The same members as those of Embodiments 1 and 2 are indicated by the same reference numerals and the explanation thereof is omitted.

In Embodiment 3, a feedback circuit 3 includes a pnp bipolar transistor 18, a mirror circuit 19 made up of two NchMOSFETs, and a resistor 20. The feedback circuit 3 generates an error amplification signal (error signal) VEAO based on the voltage value of a VCC terminal (the voltage value of feedback voltage) A Zener diode 128 is connected between the FB terminal of a control circuit 100 and a second rectifying/smoothing circuit 125.

In Embodiment 3, as in Embodiment 2, a load detection circuit is made up of a secondary current off detection circuit 14, a second latch circuit (secondary current on time detection circuit) 15, and a time-voltage converter circuit 16. The load detection circuit generates a load detection signal at a signal level corresponding to the magnitude of a load 132 based on a pulse voltage generated on an auxiliary winding 110C. The pnp bipolar transistor 18 acts as a feedback voltage variable circuit for controlling the voltage (feedback voltage) of the VCC terminal based on the load detection signal.

The pnp bipolar transistor 18 having an emitter terminal connected to the FB terminal determines the voltage of the FB terminal according to the gate voltage. The input terminal of the mirror circuit 19 is connected to the collector terminal of the pnp bipolar transistor 18. The resistor 20 is connected to the output terminal of the mirror circuit 19 and converts the output current of the mirror circuit 19 to voltage.

A filter circuit 12 is connected to the base terminal of the pnp bipolar transistor 18. The filter circuit 12 generates a signal having a voltage level corresponding to the length of a period (time T2 on) during which a secondary current Id2 passes through a diode 130 on the secondary side. Thus the voltage of the FB terminal is controlled according to the time T2 on, so that the signal level of the error amplification signal VEAO is also controlled according to the time T2 on.

Further, when the control circuit 100 is formed on the same semiconductor chip, it is possible to freely set an output voltage Vo by selecting the Zener diode 128 as an external component.

The pnp bipolar transistor 18 may be replaced with a P-channel MOSFET. Also in the switching power supply of FIG. 1, the same effect can be obtained by using the configuration of FIG. 6 for the feedback circuit 3 and connecting the Zener diode 128 to the FB terminal.

Embodiment 4

Figure 7:
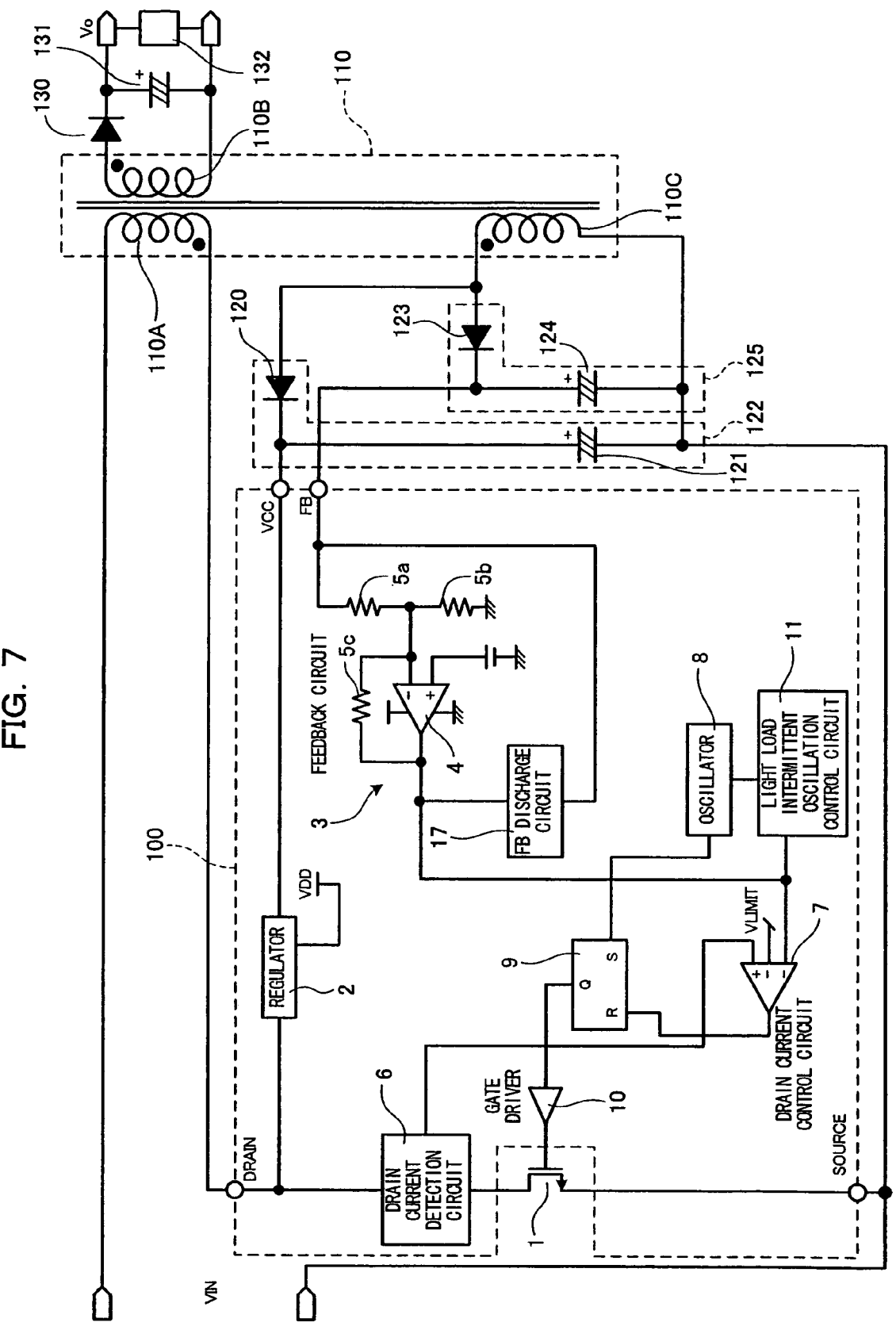
FIG. 7 is a block diagram showing a structural example of a switching power supply according to Embodiment 4 of the present invention.

A switching power supply according to Embodiment 4 of the present invention will now be described with reference to the accompanying drawings. FIG. 7 is a block diagram showing a structural example of the switching power supply according to Embodiment 4 of the present invention. The same members as those of Embodiment 1 are indicated by the same reference numerals and the explanation thereof is omitted.

The feature of the switching power supply of Embodiment 4 is that a current passing through a diode 123 is made variable instead of the internal reference voltage of a feedback circuit 3. The diode 123 is included in a second rectifying/smoothing circuit 125 for detecting secondary-side output voltage.

In Embodiment 4, as in Embodiment 1, the feedback circuit 3 also acts as a load detection circuit for generating a load detection signal at a signal level corresponding to the magnitude of a load 132 according to a pulse voltage generated on the auxiliary winding 110C, and an error amplification signal VEAO acts as the load detection signal.

In FIG. 7, an FB discharge circuit 17 connected between the output terminal of the feedback circuit 3 and the FB terminal acts as an auxiliary winding current variable circuit for controlling current passing through the rectifying/smoothing circuit 125. In other words, the FB discharge circuit 17 controls current passing through the FB terminal, that is, current passing through the diode 123. To be specific, as a load increases, that is, as the signal level of the error amplification signal VEAO increases, the FB discharge circuit 17 allows current having a high current value to pass through the FB terminal.

As described above, conventionally in PWM control, the peak of the secondary current Id passing through the secondary-side diode increases with the increase of the load and a voltage drop caused by the resistance component of the diode also increases, whereas a current passing through the diode on the auxiliary winding side hardly fluctuates with the load. Thus the output voltage Vo considerably fluctuates with the load. In contrast, in Embodiment 4, the same current as a current passing through a diode 130 on the secondary side is fed through the diode 123 included in the second rectifying/smoothing circuit 125, so that the current passing through the diode 123 is made dependent on the load. Thus fluctuations in output voltage Vo due to the load can be reduced.

In the switching power supply, when the load increases, the peak of the secondary current Id passing through the diode 130 on the secondary side increases, and the output voltage Vo decreases, the fluctuations in the output voltage Vo due to the load are reduced by the following operations: the signal level of the error amplification signal VEAO is raised to increase energy supplied to a primary winding 110A. Meanwhile, the current passing through the diode 123 is increased, a voltage drop ΔVCC caused by the resistance component of the diode 123 is increased according to a voltage drop ΔVd2 caused by the resistance component of the diode 130, and the voltage of the FB terminal (feedback voltage FB) is reduced according to a reduction in the output voltage Vo. The reduction is caused by the resistance component of the diode 130.

Figure 8:
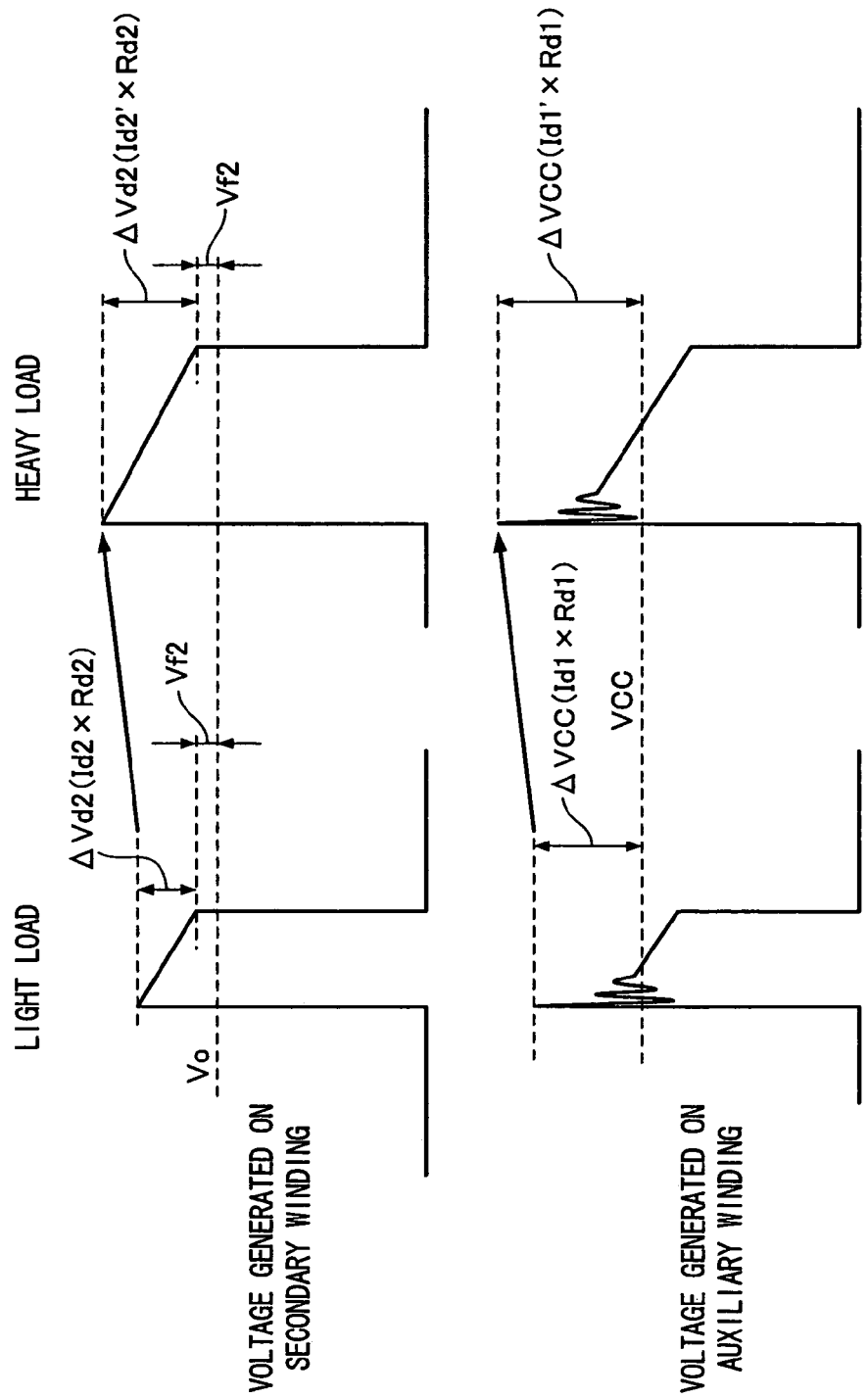
FIG. 8 shows the waveforms of voltages (PWM control) generated on a secondary winding and an auxiliary winding which are included in the switching power supply according to Embodiment 4 of the present invention.

FIG. 8 shows the waveforms of voltages generated on a secondary winding 110B and the auxiliary winding 110C at a light load and a heavy load in PWM control. In PWM control, the heavier load, the higher peak value of secondary current Id2 passing through the secondary winding 110B. Therefore, a voltage drop ?Vd2 determined by the product of a resistance component Rd2 of the diode 130 and the secondary current Id2 increases with the load. On the other hand, the peak of the current passing through the diode 123 also increases due to the operation of the FB discharge circuit 17. Therefore, the voltage drop ?VCC determined by the product of a current Id1 passing through the diode 123 and a resistance component Rd1 of the diode 123 increases with the load. As a result, fluctuations in the output voltage Vo due to the load are reduced as shown in FIG. 8.

Embodiment 5

Figure 9:
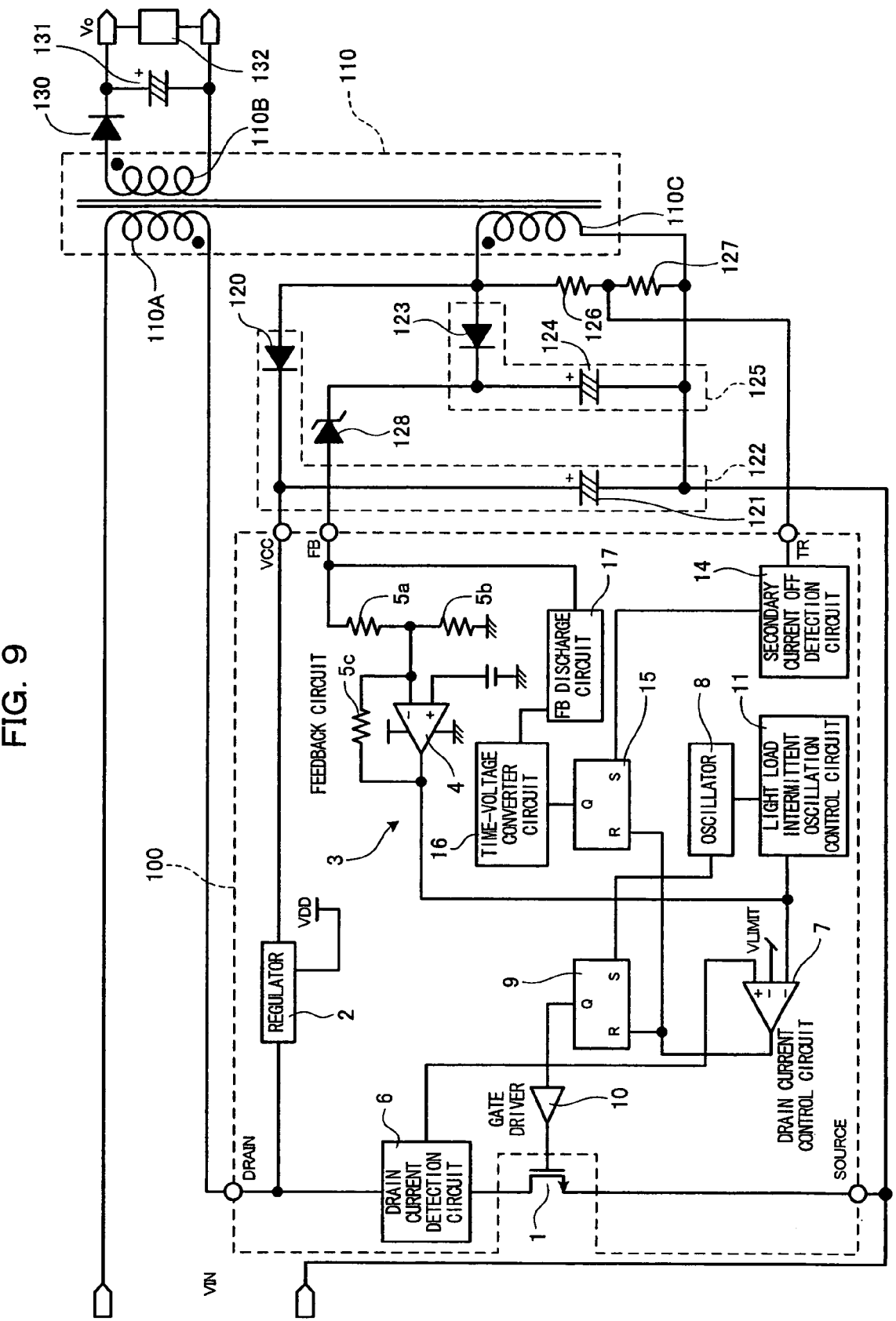
FIG. 9 is a block diagram showing a structural example of a switching power supply according to Embodiment 5 of the present invention.
Figure 10:
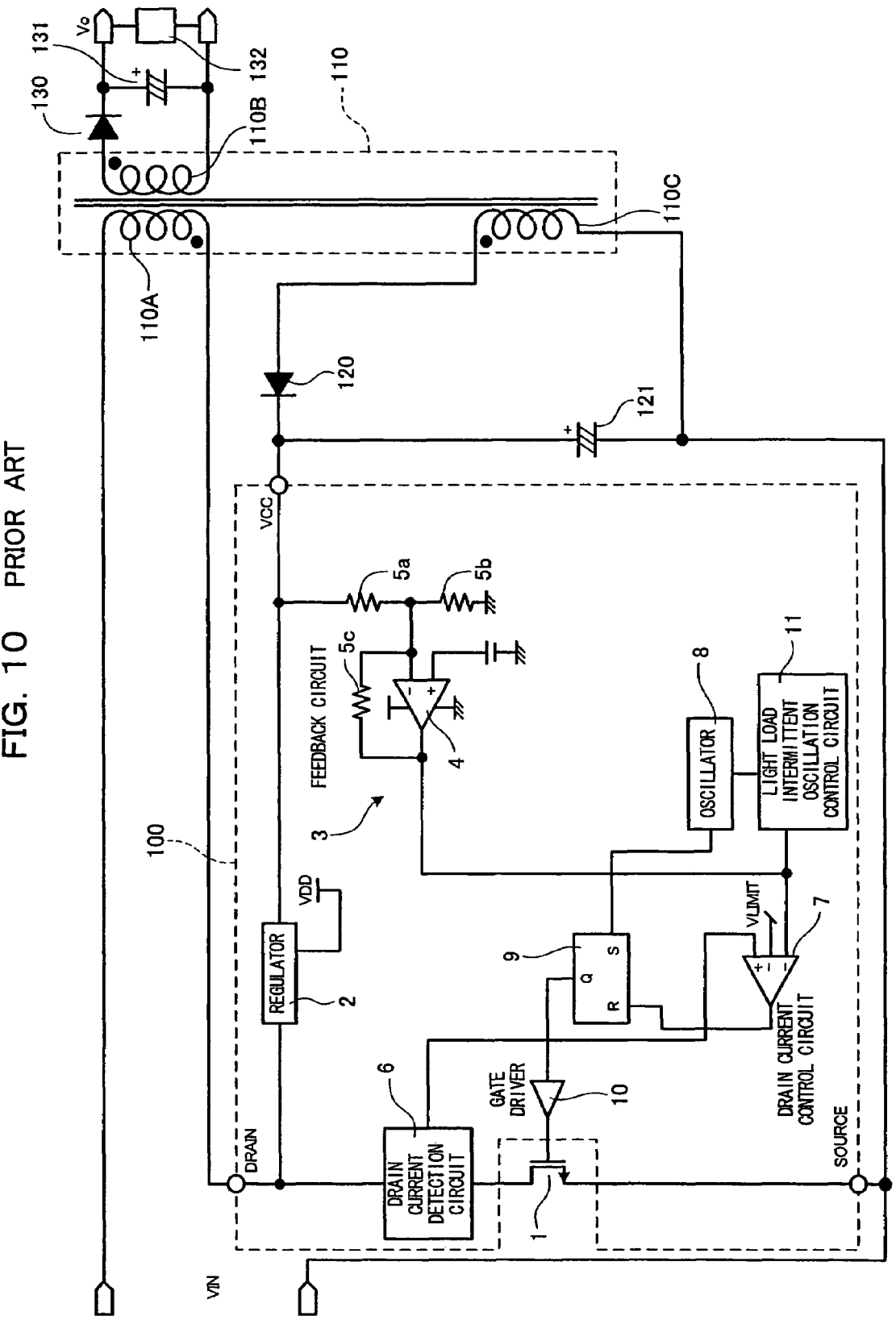
FIG. 10 is a block diagram showing a conventional switching power supply.
Figure 11:
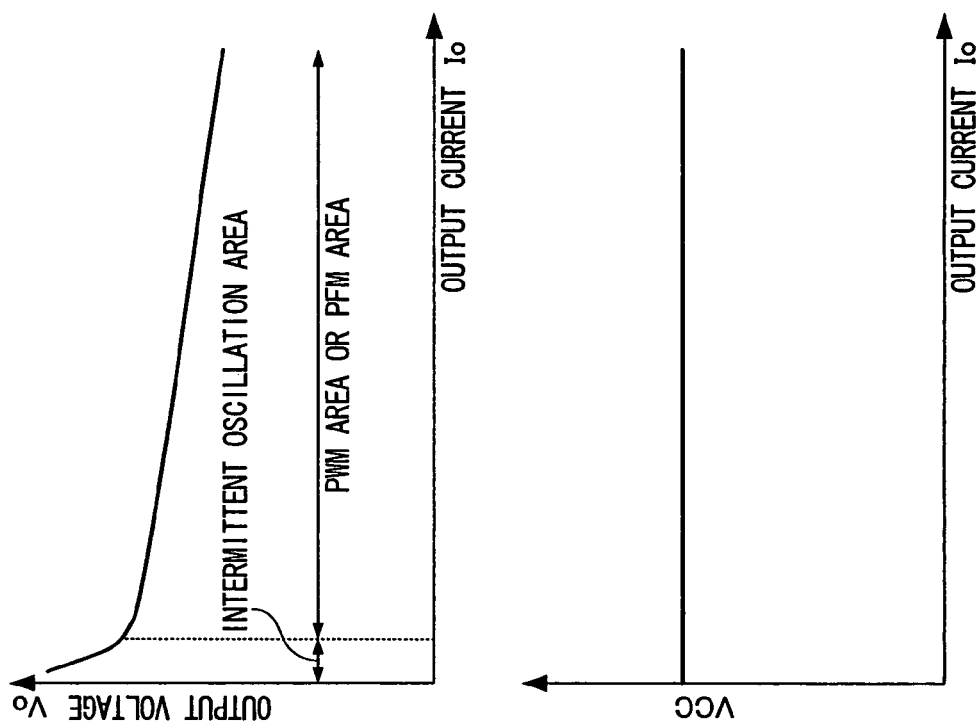
FIG. 11 shows the characteristics of an output voltage Vo and the voltage of a VCC terminal relative to an output current Io of the conventional switching power supply.
Figure 12:
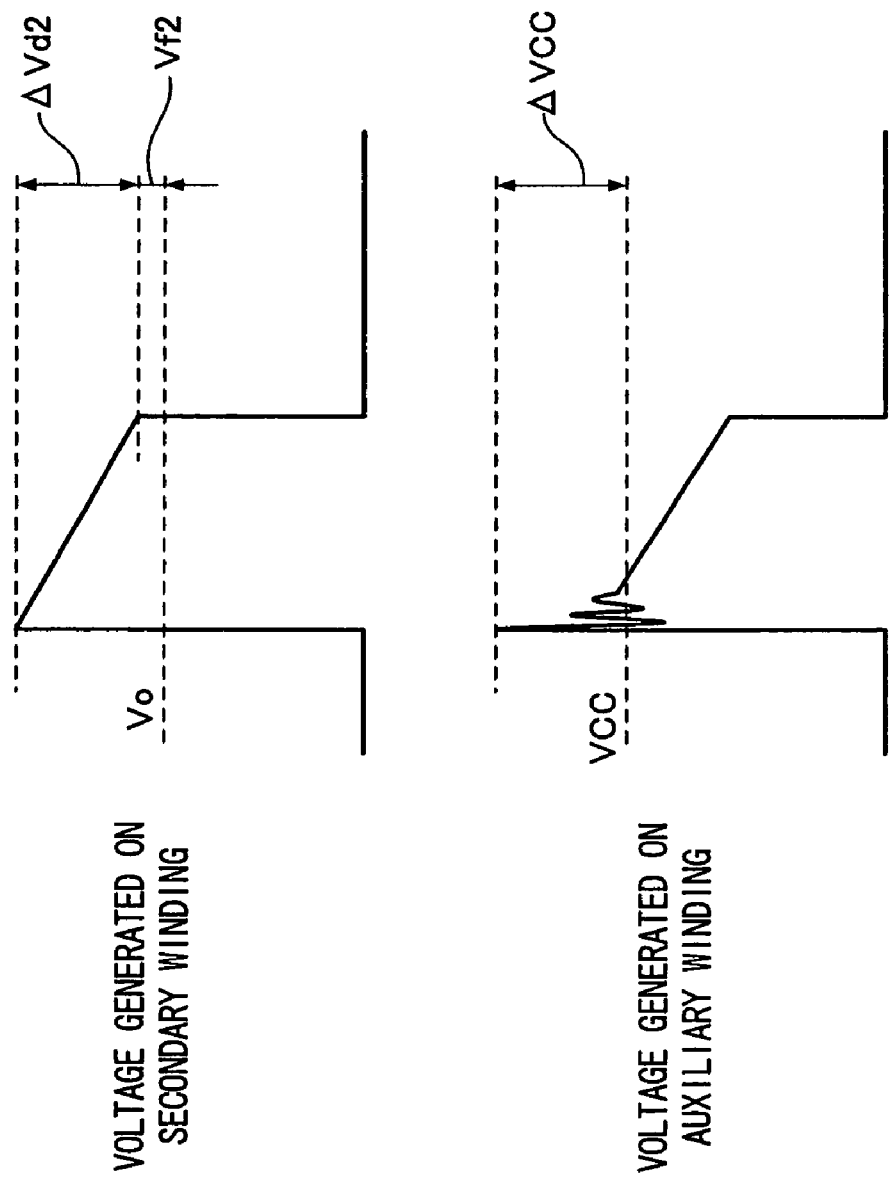
FIG. 12 shows the waveforms of voltages generated on a secondary winding and an auxiliary winding which are included in the conventional switching power supply.
Figure 13:
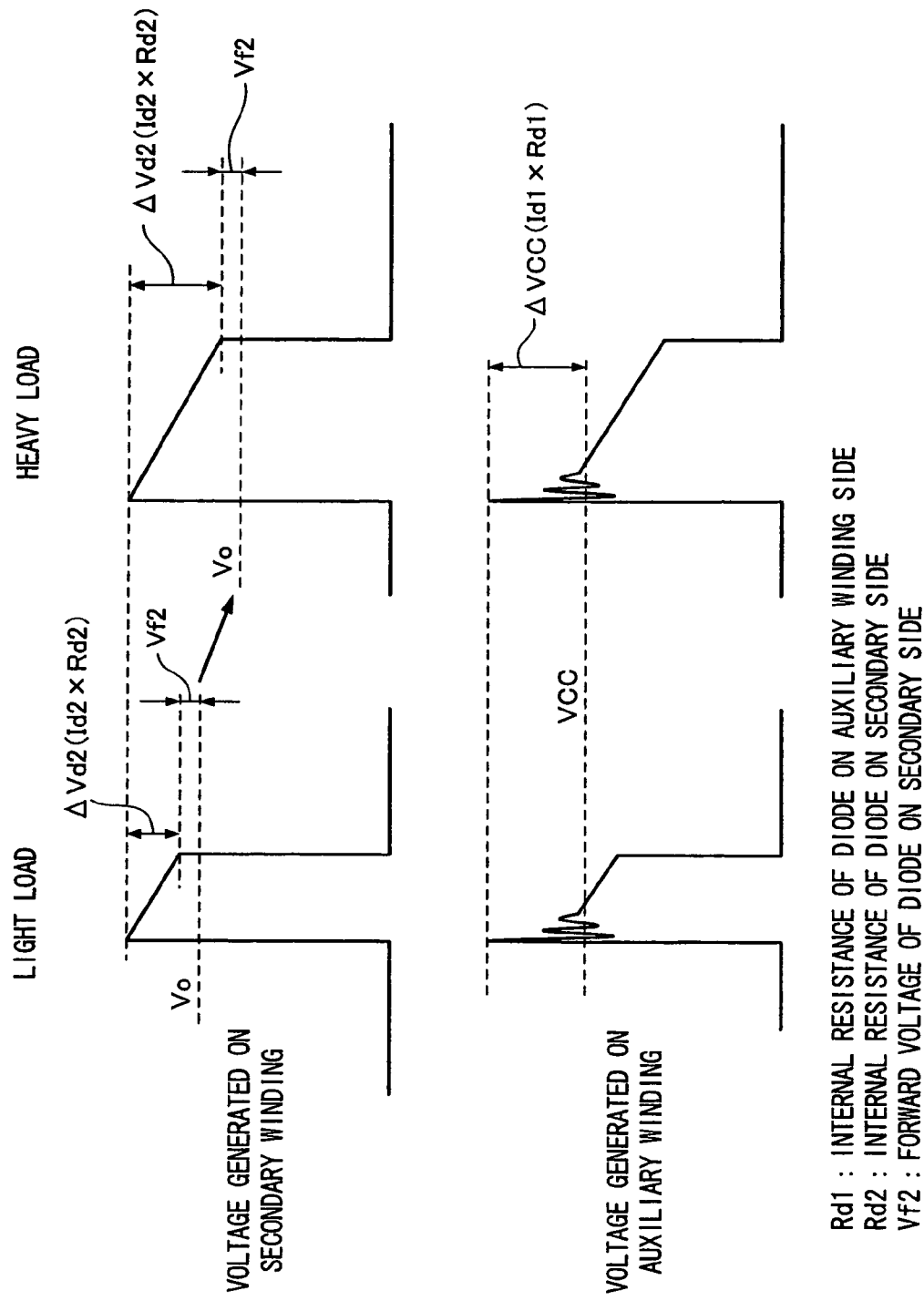
FIG. 13 shows the waveforms of voltages (PWM control) generated on the secondary winding and the auxiliary winding which are included in the conventional switching power supply.
Figure 14:
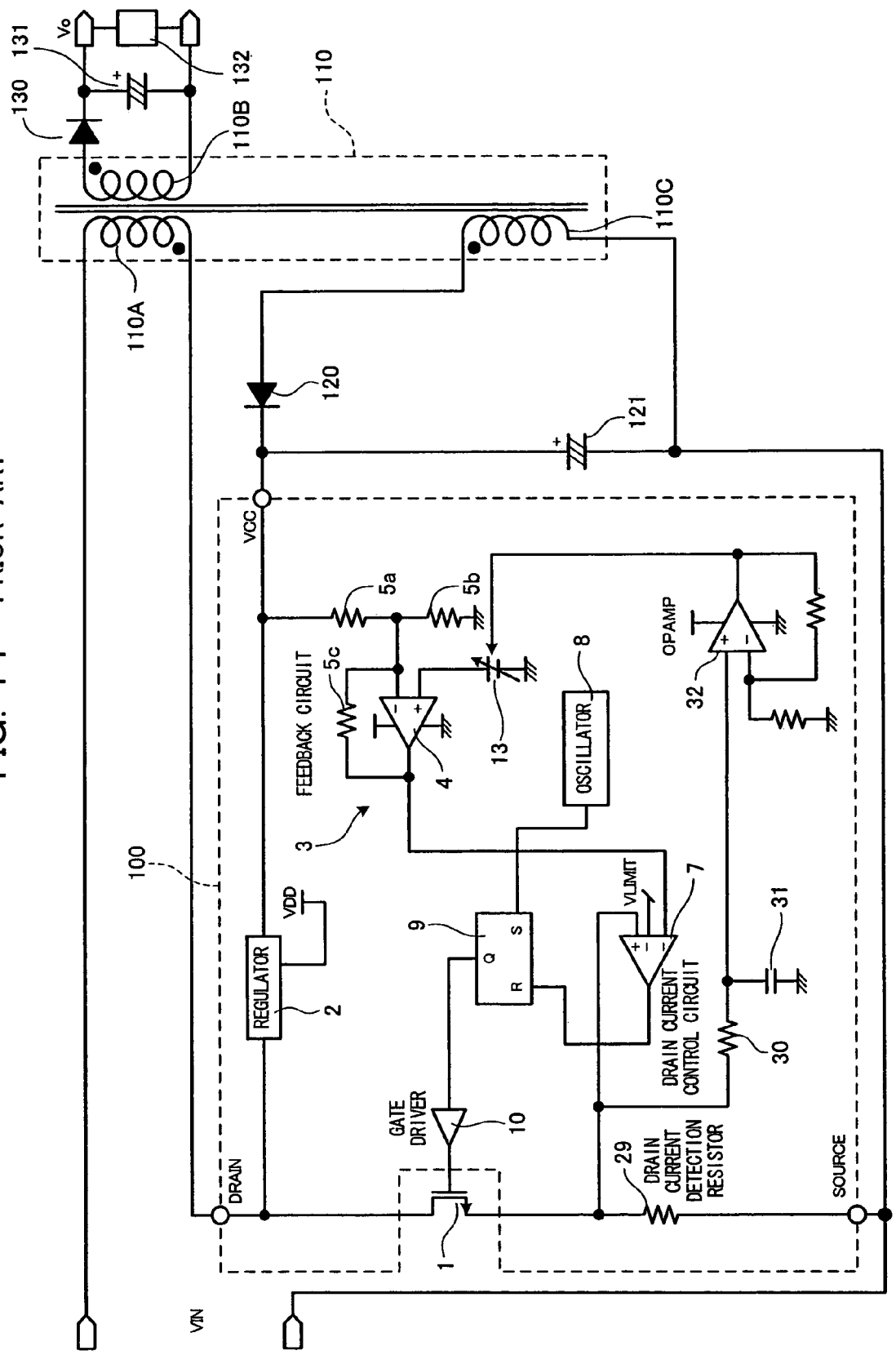
FIG. 14 is a block diagram showing the conventional switching power supply.

A switching power supply according to Embodiment 5 of the present invention will now be described below with reference to the accompanying drawings. FIG. 9 is a block diagram showing a structural example of the switching power supply according to Embodiment 5 of the present invention. The same members as those of Embodiments 1 to 4 are indicated by the same reference numerals and the explanation thereof is omitted.

The switching power supply of Embodiment 5 is combined with the switching power supplies of Embodiments 2 and 4.

To be specific, as in Embodiment 2, a load detection circuit is made up of a secondary current off detection circuit 14, a second latch circuit (secondary current on time detection circuit) 15, and a time-voltage converter circuit 16. The load detection circuit generates a load detection signal at a signal level corresponding to the magnitude of a load 132 based on a pulse voltage generated on an auxiliary winding 110C.

In Embodiment 4, the FB discharge circuit 17 acting as an auxiliary winding current variable circuit for controlling the current passing through the rectifying/smoothing circuit 125 is connected between the output terminal of the feedback circuit 3 and the FB terminal, whereas in Embodiment 5, an FB discharge circuit 17 is connected between the output terminal of the time-voltage converter circuit 16 and an FB terminal. Therefore, the FB discharge circuit 17 controls the peak of current passing trough a diode 123, according to the length of a period (time T2 on) during which a secondary current Id2 passes through a diode 130 on the secondary side.

As described above, since the time T2 on is represented by the peak value Ilimit of the drain current ID, the efficiency η, and the output voltage Vo, the switching power supply of Embodiment 5 can achieve control more reflecting the output of the secondary side as compared with the switching power supply of Embodiment 4 in which the current passing through the diode 123 is controlled in response to the signal (error amplification signal VEAO) generated by the feedback circuit 3.

The switching power supply of the present invention makes it possible to obtain constant voltage characteristics with high accuracy without using an expensive component such as a photocoupler and a secondary-side output voltage detection circuit. Therefore, the switching power supply of the present invention is useful as a switching power supply for a charger of mobile equipment and the power supply circuits of other electrical apparatuses, and particularly useful for a charger or the like of mobile equipment requiring a small and inexpensive power supply circuit.

What is claimed is:

1. A switching power supply, comprising:
   a transformer having a primary winding, a secondary winding, and an auxiliary winding,
   a switching element for switching a DC voltage supplied to the primary winding and generating a pulse voltage on the secondary winding and the auxiliary winding,
   an output voltage generation circuit for supplying an output voltage to a load, the output voltage being generated by rectifying and smoothing the pulse voltage generated on the secondary winding,
   a rectifying/smoothing circuit for generating a feedback voltage by rectifying and smoothing the pulse voltage generated on the auxiliary winding, and
   a control circuit for controlling driving of the switching element,
   wherein the control circuit includes:
   a feedback circuit for comparing a voltage value of the feedback voltage with a reference voltage value to generate an error signal,
   a load detection circuit for generating a load detection signal having a signal level corresponding to a magnitude of the load based on the pulse voltage generated on the auxiliary winding,
   a reference voltage variable circuit for controlling the reference voltage value of the feedback circuit based on the load detection signal, and
   a switching control circuit for controlling on/off of the switching element by means of the error signal.

2. The switching power supply according to claim 1, further comprising:
   an auxiliary power supply voltage generation circuit for generating an auxiliary power supply voltage by rectifying and smoothing the pulse voltage generated on the auxiliary winding, the auxiliary power supply voltage generation circuit being connected to the auxiliary winding in parallel with the rectifying/smoothing circuit,
   the control circuit further including a regulator for supplying a current to an internal circuit power supply based on the auxiliary power supply voltage and keeping a voltage of the internal circuit power supply at a constant value.

3. The switching power supply according to claim 1, wherein the feedback circuit also acts as the load detection circuit and the load detection signal is the error signal.

4. The switching power supply according to claim 1, wherein the load detection circuit comprises:
   a secondary current off detection circuit for detecting start of a decrease of the voltage of the auxiliary winding and generating a secondary current off detection signal indicating end of passage of secondary current passing through the secondary winding,
   a secondary current on time detection circuit for generating a secondary current on time detection signal set at a first signal level in a period during which the secondary current flows and set at a second signal level different from the first signal level in a period during which the secondary current does not flow, the secondary current on time detection signal being set based on the secondary current off detection signal from the secondary current off detection circuit and a signal for determining turn-off of the switching element, the signal being generated by the switching control circuit, and a time-voltage converter circuit for generating, based on the secondary current on time detection signal, the load detection signal having a signal level corresponding to a length of the period during which the secondary current flows, holding the generated load detection signal in a period of a switching operation of the switching element, and updating the load detection signal in each period, and
   the reference voltage variable circuit controls the reference voltage value of the feedback circuit based on the load detection signal from the time-voltage converter circuit.

5. The switching power supply according to claim 4, wherein the time-voltage converter circuit comprises:
   a first capacitance,
   a constant current circuit for supplying a constant current to the first capacitance in the period during which the secondary current flows,
   a pulse generation circuit for generating a pulse when the switching element is turned off,
   a discharge circuit for receiving the pulse from the pulse generation circuit and discharging the first capacitance when the switching element is turned off,
   a second capacitance for generating the load detection signal,
   a conducting circuit for bringing the first capacitance and the second capacitance into conduction in the period during which the secondary current does not flow, the conducting circuit being disposed between the first capacitance and the second capacitance, and
   the time-voltage converter circuit generates, in each period of the switching operation of the switching element, the load detection signal having a signal level corresponding to the length of the period during which the secondary current flows, and holds the load detection signal in a period of the switching operation.

6. The switching power supply according to claim 1, further comprising a filter circuit for extracting a low-frequency component from the load detection signal and supplies the signal to the reference voltage variable circuit.

7. A switching power supply, comprising:
   a transformer having a primary winding, a secondary winding, and an auxiliary winding,
   a switching element for switching a DC voltage supplied to the primary winding and generating a pulse voltage on the secondary winding and the auxiliary winding,
   an output voltage generation circuit for supplying an output voltage to a load, the output voltage being generated by rectifying and smoothing the pulse voltage generated on the secondary winding,
   a rectifying/smoothing circuit for generating a feedback voltage by rectifying and smoothing the pulse voltage generated on the auxiliary winding, and
   a control circuit for controlling driving of the switching element,
   wherein the control circuit includes:
   a feedback circuit for generating an error signal based on a voltage value of the feedback voltage,
   a load detection circuit for generating a load detection signal having a signal level corresponding to a magnitude of the load based on the pulse voltage generated on the auxiliary winding,
   a feedback voltage variable circuit for controlling the feedback voltage based on the load detection signal, and
   a switching control circuit for controlling on/off of the switching element by means of the error signal.

8. The switching power supply according to claim 7, further comprising:

an auxiliary power supply voltage generation circuit for generating an auxiliary power supply voltage by rectifying and smoothing the pulse voltage generated on the auxiliary winding, the auxiliary power supply voltage generation circuit being connected to the auxiliary winding in parallel with the rectifying/smoothing circuit, the control circuit further including a regulator for supplying a current to an internal circuit power supply based on the auxiliary power supply voltage and keeping a voltage of the internal circuit power supply at a constant value.

9. The switching power supply according to claim 7, wherein the feedback circuit also acts as the load detection circuit and the load detection signal is the error signal.

10. The switching power supply according to claim 7, wherein the load detection circuit comprises:

a secondary current off detection circuit for detecting start of a decrease of the voltage of the auxiliary winding and generating a secondary current off detection signal indicating end of passage of secondary current passing through the secondary winding, a secondary current on time detection circuit for generating a secondary current on time detection signal set at a first signal level in a period during which the secondary current flows and set at a second signal level different from the first signal level in a period during which the secondary current does not flow, the secondary current on time detection signal being set based on the secondary current off detection signal from the secondary current off detection circuit and a signal for determining turn-off of the switching element, the signal being generated by the switching control circuit, and a time-voltage converter circuit for generating, based on the secondary current on time detection signal, the load detection signal having a signal level corresponding to a length of the period during which the secondary current flows, holding the generated load detection signal in a period of a switching operation of the switching element, and updating the load detection signal in each period, and the feedback voltage variable circuit controls the feedback voltage based on the load detection signal from the time-voltage converter circuit.

11. The switching power supply according to claim 10, wherein the time-voltage converter circuit comprises:

a first capacitance, a constant current circuit for supplying a constant current to the first capacitance in the period during which the secondary current flows, a pulse generation circuit for generating a pulse when the switching element is turned off, a discharge circuit for receiving the pulse from the pulse generation circuit and discharging the first capacitance when the switching element is turned off, a second capacitance for generating the load detection signal, a conducting circuit for bringing the first capacitance and the second capacitance into conduction in the period during which the secondary current does not flow, the conducting circuit being disposed between the first capacitance and the second capacitance, and the time-voltage converter circuit generates, in each period of the switching operation of the switching element, the load detection signal having a signal level corresponding to the length of the period during which the secondary current flows, and holds the load detection signal in a period of the switching operation.

12. The switching power supply according to claim 7, further comprising a filter circuit for extracting a low-frequency component from the load detection signal and supplies the signal to the feedback voltage variable circuit.

13. A switching power supply, comprising:

a transformer having a primary winding, a secondary winding, and an auxiliary winding, a switching element for switching a DC voltage supplied to the primary winding and generating a pulse voltage on the secondary winding and the auxiliary winding, an output voltage generation circuit for supplying an output voltage to a load, the output voltage being generated by rectifying and smoothing the pulse voltage generated on the secondary winding, a rectifying/smoothing circuit for generating a feedback voltage by rectifying and smoothing the pulse voltage generated on the auxiliary winding, and a control circuit for controlling driving of the switching element, wherein the control circuit includes:

a feedback circuit for comparing a voltage value of the feedback voltage with a reference voltage value to generate an error signal, a load detection circuit for generating a load detection signal having a signal level corresponding to a magnitude of the load based on the pulse voltage generated on the auxiliary winding, an auxiliary winding current variable circuit for controlling, based on the load detection signal, current passing through the rectifying/smoothing circuit, and a switching control circuit for controlling on/off of the switching element by means of the error signal.

14. The switching power supply according to claim 13, further comprising:

an auxiliary power supply voltage generation circuit for generating an auxiliary power supply voltage by rectifying and smoothing the pulse voltage generated on the auxiliary winding, the auxiliary power supply voltage generation circuit being connected to the auxiliary winding in parallel with the rectifying/smoothing circuit, the control circuit further including a regulator for supplying a current to an internal circuit power supply based on the auxiliary power supply voltage and keeping a voltage of the internal circuit power supply at a constant value.

15. The switching power supply according to claim 13, wherein the feedback circuit also acts as the load detection circuit and the load detection signal is the error signal.

16. The switching power supply according to claim 13, wherein the load detection circuit comprises:

a secondary current off detection circuit for detecting start of a decrease of the voltage of the auxiliary winding and generating a secondary current off detection signal indicating end of passage of secondary current passing through the secondary winding, a secondary current on time detection circuit for generating a secondary current on time detection signal set at a first signal level in a period during which the secondary current flows and set at a second signal level different from the first signal level in a period during which the secondary current does not flow, the secondary current on time detection signal being set based on the secondary current off detection signal from the secondary current off detection circuit and a signal for determining turn-off of the switching element, the signal being generated by the switching control circuit, and a time-voltage converter circuit for generating, based on the secondary current on time detection signal, the load detection signal having a signal level corresponding to a length of the period during which the secondary current flows, holding the generated load detection signal in a period of a switching operation of the switching element, and updating the load detection signal in each period, and the auxiliary winding current variable circuit controls, based on the load detection signal from the time-voltage converter circuit, the current passing through the rectifying/smoothing circuit.

17. The switching power supply according to claim 16, wherein the time-voltage converter circuit comprises:

a first capacitance, a constant current circuit for supplying a constant current to the first capacitance in the period during which the secondary current flows, a pulse generation circuit for generating a pulse when the switching element is turned off, a discharge circuit for receiving the pulse from the pulse generation circuit and discharging the first capacitance when the switching element is turned off, a second capacitance for generating the load detection signal, a conducting circuit for bringing the first capacitance and the second capacitance into conduction in the period during which the secondary current does not flow, the conducting circuit being disposed between the first capacitance and the second capacitance, and the time-voltage converter circuit generates, in each period of the switching operation of the switching element, the load detection signal having a signal level corresponding to the length of the period during which the secondary current flows, and holds the load detection signal in a period of the switching operation.

* * * * *